(12) United States Patent  
Yoshiyama et al.

(10) Patent No.: US 9,001,145 B2  
(45) Date of Patent: Apr. 7, 2015

(54) IMAGE DISPLAY DEVICE AND IMAGE DISPLAY METHOD

(75) Inventors: Kazuyoshi Yoshiyama, Osaka (JP);  
Hiroyuki Furukawa, Osaka (JP);  
Naoko Kondoh, Osaka (JP); Shinji Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 373 days.

(21) Appl. No.: 13/576,664

(22) PCT Filed: Feb. 22, 2011

(86) PCT No.: PCT/JP2011/053858  
§ 371 (c)(1),  
(2), (4) Date: Aug. 2, 2012

(87) PCT Pub. No.: WO2011/105378  
PCT Pub. Date: Sep. 1, 2011

(65) Prior Publication Data  
US 2012/0307186 A1  Dec. 6, 2012

(30) Foreign Application Priority Data  
Feb. 26, 2010  (JP) ................. 2010-043103

(51) Int. Cl.  
*G09G 5/06*  (2006.01)  
*H04N 1/409*  (2006.01)  
(Continued)

(52) U.S. Cl.  
CPC .............. *G09G 5/06* (2013.01); *G09G 2340/06* (2013.01); *H04N 1/4092* (2013.01); *H04N 1/46* (2013.01);  
(Continued)

(58) Field of Classification Search  
CPC ....... G09G 5/02; G09G 2340/06; H04N 1/54; H04N 1/6005; H04N 1/6008; H04N 1/6016  
See application file for complete search history.

(56) References Cited

U.S. PATENT DOCUMENTS 7,277,075 B1 * 10/2007 Hirano et al. ................... 345/89  
7,602,401 B2 * 10/2009 Nishida et al. ................. 345/589  
(Continued)

FOREIGN PATENT DOCUMENTS

JP  2005-515504 A  5/2005  
JP  2005-141209 A  6/2005  
(Continued)

OTHER PUBLICATIONS

Official Communication issued in International Patent Application No. PCT/JP2011/053858, mailed on May 31, 2011.

Primary Examiner — Antonio A Caschera  
(74) Attorney, Agent, or Firm — Keating & Bennett, LLP

(57) ABSTRACT

An image display device has pixels each of which includes sub-pixels of four or more colors, and displays a high-definition image that has been subjected to sub-pixel-level filtering processing. The image display device includes a display panel in which color filters of sub-pixel colors including three principal colors of red, green, and blue as well as at least one color other than the three principal colors are arranged regularly; and an image processor that performs filtering processing with respect to an input image signal. The image processor includes: a principal color conversion section that generates sub-pixel signals corresponding to the sub-pixel colors, respectively, from the input image signals Rin, Bin, and Gin of the three principal colors; and a sub-pixel enhancement section that gives, to the sub-pixel signals, position information in accordance with an order of arrangement of the color filters of the sub-pixel colors in the display panel, and performs the filtering processing sub-pixel by sub-pixel.

15 Claims, 19 Drawing Sheets

(51) Int. Cl.
   *H04N 1/46*     (2006.01)
   *H04N 1/60*     (2006.01)
   *G09G 5/02*     (2006.01)
   *G09G 3/20*     (2006.01)
   *G09G 3/34*     (2006.01)

(52) U.S. Cl.
   CPC ............... *H04N 1/60* (2013.01); *G09G 3/3413* (2013.01); *G09G 5/026* (2013.01); *G09G 2300/023* (2013.01); *G09G 2300/0426* (2013.01); *G09G 2300/0452* (2013.01); *G09G 3/2074* (2013.01)

(56) References Cited

U.S. PATENT DOCUMENTS 8,390,646 B2 * 3/2013 Brown Elliott et al. ...... 345/613
2003/0128179 A1 7/2003 Credelle
2003/0128225 A1 7/2003 Credelle et al.
2004/0080479 A1 4/2004 Credelle
2005/0083355 A1 4/2005 Tezuka et al.
2007/0064020 A1 3/2007 Credelle et al.
2007/0120869 A1 5/2007 Nishida et al.
2008/0079755 A1 4/2008 Shiomi
2008/0297541 A1 12/2008 Credelle

FOREIGN PATENT DOCUMENTS

JP   2007-147692 A   6/2007
WO   01/37249 A2    5/2001
WO   03/060869 A1   7/2003
WO   03/060870 A1   7/2003
WO   2008/047291 A2 4/2008

* cited by examiner

IMAGE DISPLAY DEVICE AND IMAGE DISPLAY METHOD

TECHNICAL FIELD

The present invention relates to an image display device that displays an image obtained by subjecting an input image signal to filtering processing such as contour enhancement processing, smoothing processing, or the like. The present invention particularly relates to an image display device that includes a display section having pixels each of which is composed of sub-pixels of four or more colors including three principal colors of red, green, and blue and other colors than these three principal colors; and an image display method used in this display section.

BACKGROUND ART

Conventionally, image display devices having pixels each of which is composed of three sub-pixels for displaying three primary colors of red (R), green (G), and blue (B) so as to perform color display have been spread widely. Besides, it has been known widely that in an image display device, the following filtering processing of various types are carried out: contour enhancement processing performed by superposing high-frequency components extracted with use of a high-pass filter; and smoothing processing performed by removing high-frequency components with use of a low-pass filter. For example, by performing the contour enhancement processing, a sharp image with higher definition can be obtained. Alternatively, by performing the smoothing processing, noises are removed, whereby a smoother image can be obtained.

Still further, in order to achieve further higher definition, a technique for generating a display image by performing the following steps has been proposed: generating an image with sub-pixel-level fineness by interpolation, generating an enhanced image in which components belonging to a specific frequency band of the sub-pixel-level image are enhanced, and performing sub-pixel rendering processing (see, for example, JP2005-141209A).

DISCLOSURE OF THE INVENTION

Recently, in order to expand the color reproduction range (range of colors that can be displayed), image display devices having the following configuration are becoming practically applied: each pixel therein is composed of four or more sub-pixels, which are sub-pixels of three colors of red, green, and blue, and a sub-pixel of, for example, yellow or cyan additionally.

In the case where the above-described conventional sub-pixel-rendering processing is applied in an image display device in which each pixel is thus composed of sub-pixels of four or more colors, a complex circuit configuration is needed for generating interpolated images. Therefore, there arises a problem of an increase in the device manufacturing costs. For example, in the case where an input image signal for one pixel has color components of three colors of R, G, and B, the configuration disclosed in the above-mentioned Patent Document 1 makes it necessary to generate an interpolated image having components of three times the aforementioned color components, that is, nine components. This problem becomes more serious as the number of colors of sub-pixels increases.

In light of the above-described problem, it is an object of the present invention to provide an image display device that includes a display section having pixels each of which includes sub-pixels of four or more colors, and displays an image of finer definition that has been subjected to a sub-pixel-level filtering processing; and an image display method for the display section.

To achieve the above-described object, an image display device disclosed herein is an image display device that includes: a display section in which color filters of sub-pixel colors including three principal colors of red, green, and blue as well as at least one color other than the three principal colors are arranged regularly; and an image processor that performs filtering processing with respect to an input image signal, wherein the image processor includes: a principal color conversion section that generates sub-pixel signals corresponding to the sub-pixel colors, respectively, from the input image signals of the three principal colors; and a sub-pixel processing section that gives, to the sub-pixel signals, position information in accordance with an order of arrangement of the color filters of the sub-pixel colors in the display section, and performs the filtering processing sub-pixel by sub-pixel.

An image display method disclosed herein is an image displaying method for displaying an image on a display section in which color filters of sub-pixel colors including three principal colors of red, green, and blue as well as at least one color other than the three principal colors are arranged regularly, and the method includes the steps of generating sub-pixel signals corresponding the sub-pixel colors, respectively, from an input image signal of the three principal colors; and giving, to the sub-pixel signals, position information in accordance with an order of arrangement of the color filters of the sub-pixel colors in the display section, and performing the filtering processing sub-pixel by sub-pixel.

The present invention makes it possible to provide an image display device that includes a display section having pixels each of which includes sub-pixels of four or more colors, and displays an image of finer definition that has been subjected to a sub-pixel-level filtering processing; and an image display method for the display section.

EMBODIMENTS FOR CARRYING OUT THE INVENTION

Figure 1:
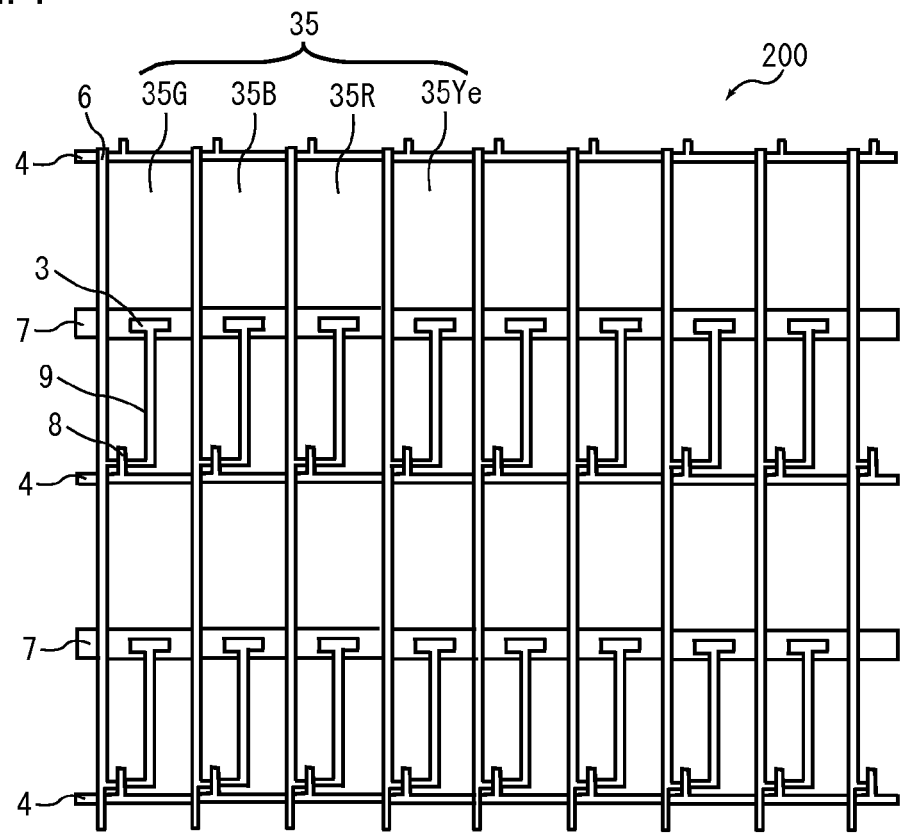
FIG. 1 is a plan view showing a schematic configuration of an active matrix substrate provided in a liquid crystal display device according to Embodiment 1.

An image display device according to one embodiment of the present invention includes: a display section in which color filters of sub-pixel colors including three principal colors of red, green, and blue as well as at least one color other than the three principal colors are arranged regularly; and an image processor that performs filtering processing with respect to an input image signal, wherein the image processor includes: a principal color conversion section that generates sub-pixel signals corresponding to the sub-pixel colors, respectively, from the input image signals of the three principal colors; and a sub-pixel processing section that gives, to the sub-pixel signals, position information in accordance with an order of arrangement of the color filters of the sub-pixel colors in the display section, and performs the filtering processing sub-pixel by sub-pixel.

In this configuration, the principal color conversion section generates sub-pixel signals corresponding to sub-pixel colors, respectively, from input image signals of the three principal colors, in the image processor. Further, the sub-pixel processing section gives, to the sub-pixel signals, position information in accordance with an order of arrangement of the color filters of the sub-pixel colors in the display section, and performs the filtering processing sub-pixel by sub-pixel.

This makes it possible to provide an image display device that has pixels each of which includes sub-pixels of four or more colors, and displays high-definition images that have been subjected to sub-pixel-level filtering processing, without performing interpolation processing as in the conventional configuration.

The image display device according to the above-described embodiment may have a configuration in which the sub-pixel processing section has a high-pass filter portion that performs high-frequency component enhancement processing. This configuration allows high-definition display subjected to sub-pixel-level enhancement processing to be realized. Further, in this case, it is preferable that the sub-pixel processing section further includes a monochromatic component extractor that extracts a minimum value among those of a plurality of sub-pixel signals belonging to one pixel as a monochromatic component, and outputs the extracted monochromatic component to the high-pass filter portion. This is because hue changes can be suppressed by performing high-frequency component enhancement processing with respect to only monochromatic components.

The image display device according to the above-described embodiment may have a configuration in which the sub-pixel processing section includes a low-pass filter that performs smoothing processing. This configuration allows smooth display with noises being suppressed at the sub-pixel level to be realized. In this case, it is preferable that the sub-pixel processing section further includes a monochromatic component extractor that extracts a minimum value among those of a plurality of sub-pixel signals belonging to one pixel as a monochromatic component, and outputs the extracted monochromatic component to the low-pass filter. This is because hue changes can be suppressed by performing smoothing processing with respect to only monochromatic components.

In the configuration in which sub-pixel processing section further includes the low-pass filter, preferably, the image processor further includes a pixel enhancement section that performs high-frequency component enhancement processing pixel by pixel, with respect to the input image signal of the three principal colors. This allows smooth display with noises being suppressed at the sub-pixel level to be realized, though the enhancement degree at pixel edges decreases as compared with the case where only enhancement processing is carried out pixel by pixel.

It should be noted that the above-described pixel enhancement section may include: a red-pixel high-pass filter part that performs high-frequency component enhancement processing pixel by pixel, with respect to an input image signal of red; a green-pixel high-pass filter part that performs high-frequency component enhancement processing pixel by pixel, with respect to an input image signal of green; and a blue-pixel high-pass filter part that performs high-frequency component enhancement processing pixel by pixel, with respect to an input image signal of blue.

Alternatively, the pixel enhancement section may include: a color space conversion part divides the input image signal of the three principal colors into a brightness signal and a color-difference signal; a high-pass filter part that performs high-frequency component enhancement processing with respect to the brightness signal; a delay unit that delays the color-difference signal; and a color space reverse conversion part that receives an output from the high-pass filter part and an output from the delay unit, and converts the same into the same form as that of the input image signal of the three principal colors. This configuration allows the circuit size of the pixel enhancement section to decrease to about one third as compared with the configuration described above. Besides, only the brightness signals can be subjected to enhancement processing, whereby the effect of suppressing hue changes can be achieved.

In the image display device according to the present embodiment, in the case where the color filters of the sub-pixel colors in the display section have uniform sizes, a filter coefficient in the filtering processing in the sub-pixel processing section preferably has a value at an evenly sampled point of a filter function. On the other hand, in the case where the color filters of the sub-pixel colors in the display section have non-uniform sizes, a filter coefficient in the filtering processing in the sub-pixel processing section preferably has a value at an unevenly sampled point of a filter function.

In the image display device according to the present embodiment, the sub-pixel colors other than the three primary colors preferably include at least one color selected from yellow; cyan; magenta; white; red having a chroma different from that of the red as the primary color; green having a chroma different from that of the green as the primary color; and blue having a chroma different from that of the blue as the primary color.

In the case where yellow, cyan, or magenta is used as the sub-pixel color, an effect of obtaining a widened color range, for example, can be achieved, as compared with the case where only the three principal colors of red, green, and blue are used as sub-pixel colors. Alternatively, in the case where white is used as a sub-pixel color in place of yellow, the brightness can be increased. Further alternatively, in the case where red having a chroma different from that of the red as the primary color, green having a chroma different from that of the green as the primary color, or blue having a chroma different from that of the blue as the primary color, is used as the sub-pixel color in place of yellow, deeper colors can be reproduced.

Further, an image display method according to one embodiment of the present invention is an image displaying method for displaying an image on a display section in which color filters of sub-pixel colors including three principal colors of red, green, and blue as well as at least one color other than the three principal colors are arranged regularly, and the method includes the steps of generating sub-pixel signals corresponding the sub-pixel colors, respectively, from an input image signal of the three principal colors; and giving, to the sub-pixel signals, position information in accordance with an order of arrangement of the color filters of the sub-pixel colors in the display section, and performing the filtering processing sub-pixel by sub-pixel.

Embodiment

The following description explains embodiments of the present invention in detail, while referring to the drawings. The same or equivalent portions are denoted by the same reference numerals in the drawings, and duplicate descriptions are avoided.

Embodiment 1

FIG. 1 is a plan view showing a schematic configuration of an active matrix substrate 200 provided in a liquid crystal display device according to Embodiment 1.

As shown in FIG. 1, the active matrix substrate 200 has a plurality of scanning lines 4 and signal lines 6 arranged in matrix. At each of intersections of the scanning lines 4 and the signal lines 6, a thin-film transistor (TFT) 8 is provided. Each of areas surrounded by the scanning lines 4 and the signal line 6 is provided with a pixel electrode 35. The pixel electrodes 35 are formed with a transparent conductive material such as indium tin oxide (ITO) or the like.

In the example shown in FIG. 1, the pixel electrodes 35R among the pixel electrodes 35 are pixel electrodes facing color filters of red (R) in a color filter substrate that will be described later. Likewise, the pixel electrodes 35G and 35B are pixel electrodes facing color filters of green (G) and blue (B), respectively. Pixel electrodes 35Ye are pixel electrodes facing color filters of yellow (Ye). In other words, in the present embodiment, one pixel is composed of four sub-pixels that include a sub-pixel of yellow in addition to sub-pixels of the three principal colors of red, green, and blue.

It should be noted that the color used as the sub-pixel color other than the three principal colors is not limited to yellow, though sub-pixels of yellow (Ye) are used as sub-pixels of a color other than the three principal colors in the example shown in FIG. 1. For example, cyan or magenta may be used in place of yellow. In the case where yellow, cyan, or magenta is used as the sub-pixel color, an effect of obtaining a widened color range, for example, can be achieved, as compared with the case where only the three principal colors of red, green, and blue are used as sub-pixel colors. Alternatively, in the case where white is used as a sub-pixel color in place of yellow, the brightness can be increased. Further alternatively, in the case where red having a chroma different from that of the red as the primary color, green having a chroma different from that of the green as the primary color, or blue having a chroma different from that of the blue as the primary color, is used as the sub-pixel color in place of yellow, deeper colors can be reproduced.

The gate electrode of each TFT 8 is connected to the scanning line 4. The source electrode of the TFT 8 is connected to the signal line 6. The drain electrode of the TFT 8 is connected to the pixel electrode 35 via a drain lead line 9. An auxiliary capacitance line 7 for holding a voltage applied to the pixel electrode 35 is arranged in parallel with each scanning line 4. The auxiliary capacitance line 7 faces a terminal portion of the drain lead line 9 with an insulative film being interposed therebetween, so as to form an auxiliary capacitor 3.

Figure 2:
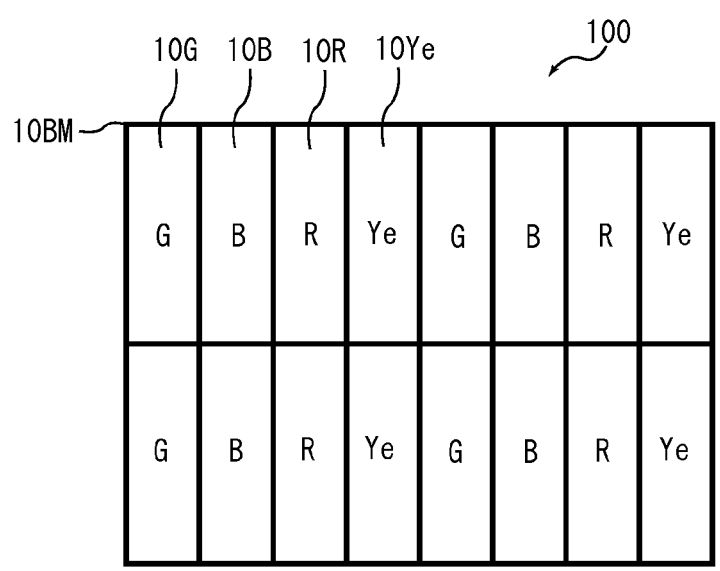
FIG. 2 is a plan view showing a schematic configuration of the color filter substrate provided in a liquid crystal display device according to Embodiment 1.

FIG. 2 is a plan view showing a schematic configuration of a color filter substrate (counter substrate) 100 provided in the liquid crystal display device according to Embodiment 1.

In the color filter substrate 100, as shown in FIG. 2, color filters 10G, 10B, and 10R of three primary colors of green (G), blue (B), and red (R), and color filters 10Ye of yellow are arranged in the stated order in a stripe form.

A black matrix 10BM is provided in spaces around the color filters and between the filters. It should be noted that the color filters 10R, 10G, 10B, and 10Ye have characteristics of selectively transmitting components in vicinities of specific wavelengths, respectively. More specifically, the color filters 10R, 10G, and 10B of red, green, and blue mainly transmit red components, green components, and blue components of incident light, respectively. The color filters 10Ye mainly transmit both of red components and green components of incident light.

The color filters 10R, 10G, 10B, and 10Ye are provided so as to face the pixel electrodes 35R, 35G, 35B, and 35Ye provided in the active matrix substrate 200 described above, respectively. The black matrix 10BM is provided so as to face the scanning lines 4 and the signal lines 6.

Figure 3:
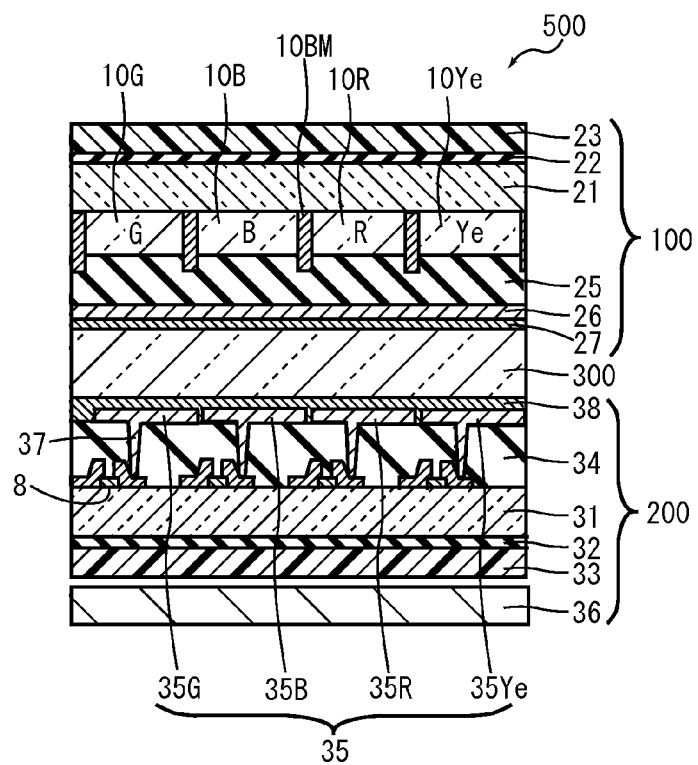
FIG. 3 is a cross-sectional view showing a schematic structure of the liquid crystal display device according to Embodiment 1.

FIG. 3 is a schematic cross-sectional view showing a schematic structure of a display panel 500 (display section) provided in the liquid crystal display device according to Embodiment 1.

As shown in FIG. 3, the display panel 500 of the present embodiment has a liquid crystal layer 300 between the color filter substrate 100 and the active matrix substrate 200. The color filter substrate 100 has a phase difference plate 22 and a polarizing plate 23 on an outer side (observed face side) of a glass substrate 21. On an inner side (back face side) of the glass substrate 21, the color filter substrate 100 has the color filters 10R, 10G, 10B, and 10Ye, the black matrix 10BM, an overcoat layer 25, a counter electrode 26, and an alignment film 27.

The phase difference plate 22 adjusts a polarization state of light transmitted therethrough. The polarizing plate 23 transmits only light of specific polarized light components. In the present embodiment, the arrangement and configuration of the phase difference plate 22 and the polarizing plate 23 are adjusted so that the phase difference plate 22 and the polarizing plate 23 function as a circularly polarizing plate.

The overcoat layer 25 prevents contaminants from being eluted into the liquid crystal layer 300 from the color filters 10R, 10G, 10B, and 10Ye, and flattens the surface of the color filter substrate 100. The counter electrode 26 is formed over an entire surface of the color filter substrate 100. The counter electrode 26 is formed of a transparent conductive material such as indium tin oxide (ITO) or the like. The alignment film 27 controls the alignment of liquid crystal molecules in the liquid crystal layer 300.

The active matrix substrate 200 has a phase difference plate 32 and a polarizing plate 33 on an outer side (back face side) of a glass substrate 31. On an inner side (observed face side) of the glass substrate 31, there are provided thin film transistors (TFTs) 8, an interlayer insulative film 34, pixel electrodes 35 (35R, 35G, 35B, and 35Ye), an alignment film 38, and the like.

The phase difference plate 32 adjusts a polarization state of light transmitted therethrough, as is the case with the phase difference plate 22. The polarizing plate 33 transmits only light of specific polarized light components, as is the case with the polarizing plate 23. In the present embodiment, the polarizing plate 33 is arranged so that the polarization axis of the polarizing plate 33 and the polarizing axis of the circularly polarizing plate (the phase difference plate 22 and the polarizing plate 23) provided on the color filter substrate 100 side cross each other orthogonally.

It should be noted that the above-described settings of the phase difference plate 22, the polarizing plate 23, the phase difference plate 32, and the polarizing plate 33 are merely exemplary. These optical members may be set so as to realize different optical characteristics. Depending on the liquid crystal mode, required optical characteristics, etc., at least one of the phase difference plate and the polarizing plate is not required in some cases.

The pixel electrodes 35 (35R, 35G, 35B, and 35Ye) are connected to the TFTs 8 via contact holes 37, respectively. The pixel electrodes 35 are driven by the TFTs 8 and apply voltages to the liquid crystal layer 300, thereby driving liquid crystal molecules. The alignment film 38 controls alignment of liquid crystal molecules in the liquid crystal layer 300, as is the case with the alignment film 27.

On a reverse face side (back face side) of the active matrix substrate 200, a backlight 36 is provided. It should be noted that, though the display panel 500 shown herein as an example is provided with the back light 36 as it is a transmission-type liquid crystal display panel, the backlight is unnecessary in some cases.

Next, the following description explains the image processing in the liquid crystal display device according to the present embodiment.

Figure 4:
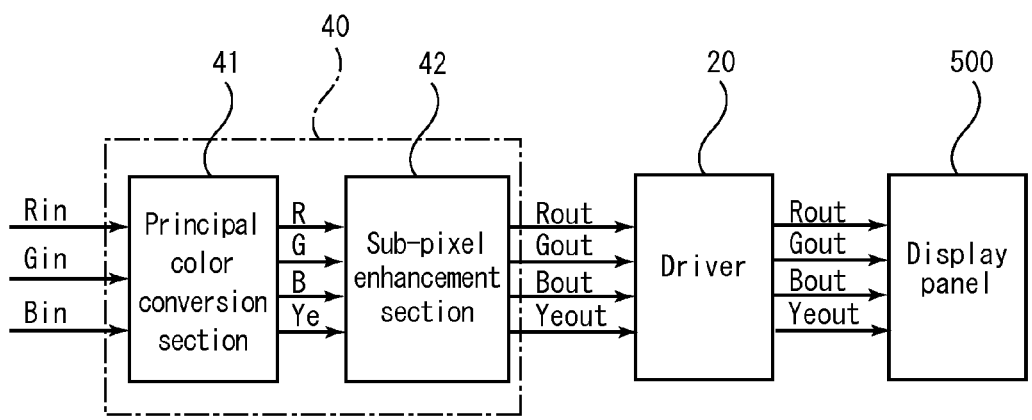
FIG. 4 is a block diagram showing a schematic configuration of a liquid crystal display device according to Embodiment 1.

As shown in FIG. 4, the liquid crystal display device according to the present embodiment includes an image processing circuit 40 that receives image signals Rin, Gin, and Bin of the three principal colors of R, G, and B, and outputs image signals Rout, Gout, Bout, and Yeout of the four colors of R, G, B, and Ye, as an image processing device that supplies image signals to the display panel 500. It should be noted that the image processing circuit 40 of the present embodiment performs a processing of converting image signals of the three principal colors into image signals of the four colors, as well as enhancing an contour of an input image signal, as will be explained in more detail later.

It should be noted that the image processing circuit 40 can be realized as, for example, a circuit chip mounted on a circuit board of the display panel 500. Alternatively, the image processing circuit 40 can be realized with a memory element that stores a computer program that realizes the function, and a general-purpose processor that reads out the program from the memory element and executes the program.

Further, the liquid crystal display device of the present embodiment includes a driver 20 that supplies an output image signal from the image processing circuit 40 to the display panel 500. The driver 20 drives the display panel 500 by using the image signals supplied from the image processing circuit 40 and various types of control signals such as clock signals and synchronization signals.

Figure 5:
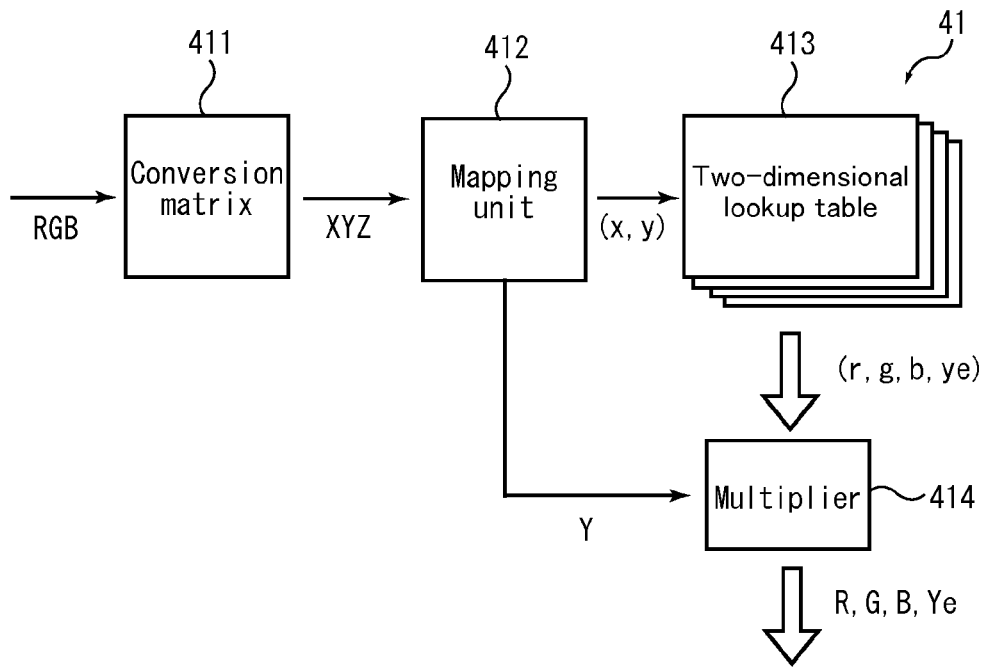
FIG. 5 is a block diagram showing an exemplary schematic configuration of a principal color conversion section provided in an image processing circuit shown in FIG.

As shown in FIG. 4, the image processing circuit 40 includes a principal color conversion section 41 and a sub-pixel enhancement section 42. The principal color conversion section 41 converts input image signals expressed with the three principal colors into image signals (sub-pixel signals) expressed with the four colors of sub-pixels. In other words, the principal color conversion section 41 receives image signals of the three principal colors of R, G, and B, and converts the same into image signals of the four colors of R, G, B, and Ye. The sub-pixel enhancement section 42 performs contour enhancement processing with respect to the image signals of the four colors outputted from the principal color conversion section 41, sub-pixel by sub-pixel, while taking the spatial positional relationship (the arrangement of sub-pixels) into consideration. The image processing circuit 40, as including this sub-pixel enhancement section 42, is able to increase fineness of images sub-pixel by sub-pixel. Here, the following description explains exemplary configuration and operation of the principal color conversion section 41. FIG. 5 is a block diagram showing an exemplary schematic configuration of the principal color conversion section 41. As shown in FIG. 5, the principal color conversion section 41 includes a conversion matrix 411, a mapping unit 412, a two-dimensional lookup table 413, and a multiplier 414.

The conversion matrix 411 converts RGB signals supplied to the principal color conversion section 41 into signals (XYZ signals) corresponding to a color space of an XYZ color system. The mapping unit 42 generates signals corresponding to the Y value and the chromaticity coordinates (x, y) by mapping the XYZ signals to the x-y coordinate space.

The two-dimensional lookup table 413 has a plurality of two-dimensional lookup tables, which are in the same number as the number of the colors of the sub-pixels. For example, in the case where image signals of four colors of R, G, B, and Ye are generated from image signals of the three principal colors of R, G, and B, as is the case with the present embodiment, the two-dimensional lookup table 413 has four two-dimensional lookup tables corresponding to the four colors of R, G, B, and Ye, respectively. The two-dimensional lookup table 413, when given a chromatic coordinate (x, y), outputs data (r, g, b, ye) corresponding to a hue and a chroma of a color to be displayed by each sub-pixel.

The multiplier 414 multiplies a Y value and output data (r, g, b, ye) from the two-dimensional lookup table 413, whereby signals of R, G, B, and Ye corresponding to the sub-pixel colors, respectively, are generated.

It should be noted that exemplary configuration and operation of the principal color conversion section 41 explained herein with reference to FIG. 5 is merely an example, and the method for converting image signals of the three principal colors into image signals corresponding to sub-pixels of four or more colors is not limited to this.

Figure 6:
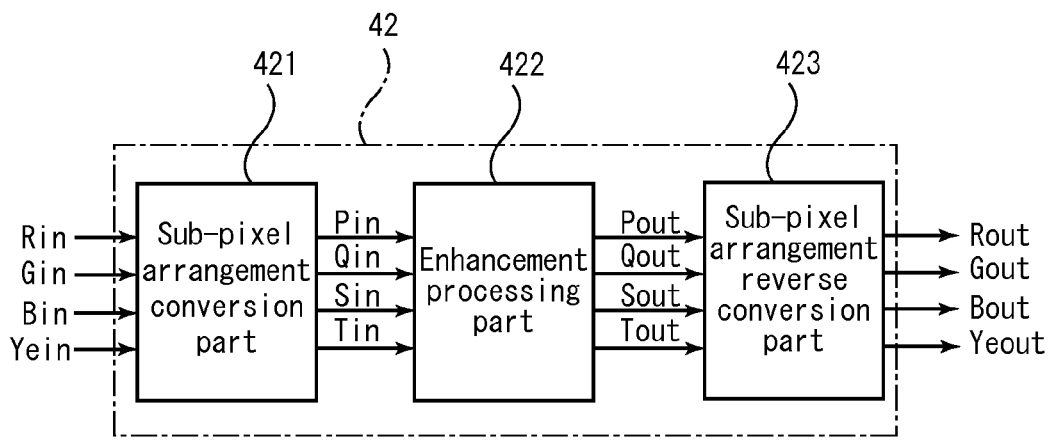
FIG. 6 is a block diagram showing a schematic configuration of a sub-pixel enhancement section provided in the image processing circuit shown in FIG. 4.
Figure 7:
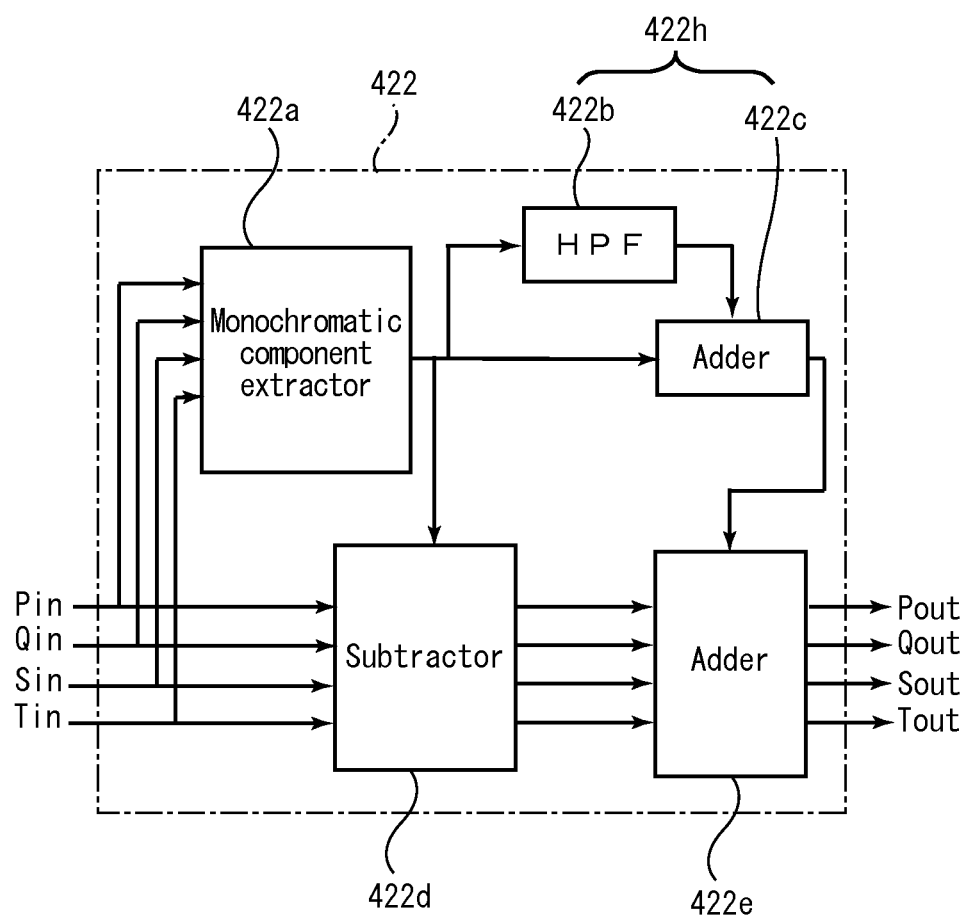
FIG. 7 is a block diagram showing a schematic configuration of an enhancement processing part provided in the sub-pixel enhancement section shown in FIG. 6.

Next, the following description explains exemplary configuration and operation of the sub-pixel enhancement section 42, while referring to FIGS. 6 and 7.

FIG. 6 is a block diagram showing a schematic configuration of the sub-pixel enhancement section 42.

As shown in FIG. 6, the sub-pixel enhancement section 42 includes a sub-pixel arrangement conversion part 421, an enhancement processing part 422, and a sub-pixel arrangement reverse conversion part 423.

The sub-pixel arrangement conversion part 421 re-arranges RGBYe signals fed from the principal color conversion section 41 in an order of the spatial arrangement of sub-pixels in the display panel 500. In other words, the sub-pixel arrangement conversion part 421 gives position information corresponding to a spatial position of each sub-pixel in the display panel 500, to each sub-pixel color component of the sub-pixel signals of four colors (RGBYe signals) fed from the principal color conversion section 41. The enhancement processing part 422 performs enhancement processing for enhancing an output from the sub-pixel arrangement conversion part 421 sub-pixel by sub-pixel. The sub-pixel arrangement reverse conversion part 423 re-arranges an output signal from the enhancement processing part 422 in the original order of the RGBYe signals.

FIG. 7 is a block diagram showing a schematic configuration of the enhancement processing part 422. As shown in FIG. 7, the enhancement processing part 422 includes a monochromatic component extractor 422a, a high-pass filter (HPF) 422b, an adder 422c, a subtractor 422d, and adder 422e.

The monochromatic component extractor 422a extracts monochromatic components from the RGBYe signals (PQST signals) rearranged by the sub-pixel arrangement conversion part 421. Here, the monochromatic component extractor 422a calculates a minimum value among sub-pixel values in one pixel from the PQST signals fed thereto, and outputs the minimum value as a monochromatic component.

The high-pass filter 422b extracts high-frequency components out of the monochromatic components extracted by the monochromatic component extractor 422a, sub-pixel by sub-pixel. The adder 422c adds the high-frequency components extracted by the high-pass filter 422b and the monochromatic components. Thus, the output signal from the adder 422c is monochromatic components with the high-frequency components being enhanced sub-pixel by sub-pixel. In other words, the high-pass filter 422b and the adder 422c composes a high-pass filter portion 422h that performs enhancement processing with respect to monochromatic components sub-pixel by sub-pixel.

It should be noted that in the high-pass filter portion 422h in FIG. 7, high-frequency components extracted by the high-pass filter 422b and a monochromatic components are simply added by the adder 422c. However, the method of the enhancement processing is not limited to this. For example, the configuration may be as follows: high-frequency components extracted by the high-pass filter 422b are subjected to gain processing or the like, and thereafter, they are added with monochromatic components.

The subtractor 422d subtracts monochromatic components from the PQST signals. Thus, an output from the subtractor 422d is color components extracted from the PQST signals. The adder 422e adds an output signal of the subtractor 422d and an output signal of the adder 422c.

Here, the following description explains an effect of the processing by the image processing circuit 40, while referring to specific examples.

Figure 8A:
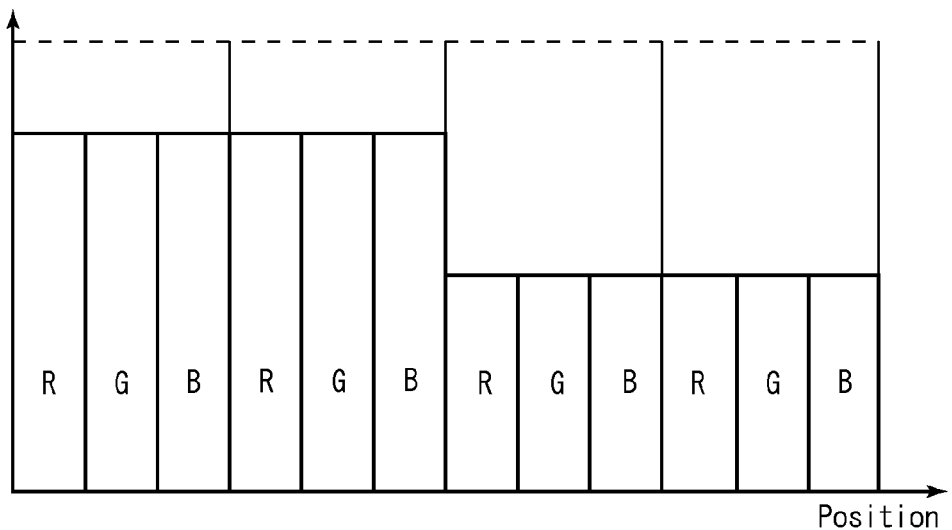
FIG. 8A shows exemplary RGB input signals (monochromatic signals) to be fed to the image processing circuit according to Embodiment 1.

First, a case where input signals to the image processing circuit 40 are monochromatic signals is explained, with reference to FIGS. 8A to 8D. It should be noted that in the case where input signals are monochromatic signals, the respective components of R, G, and B of an input signal have the same values, as shown in FIG. 8A.

Figure 8B:
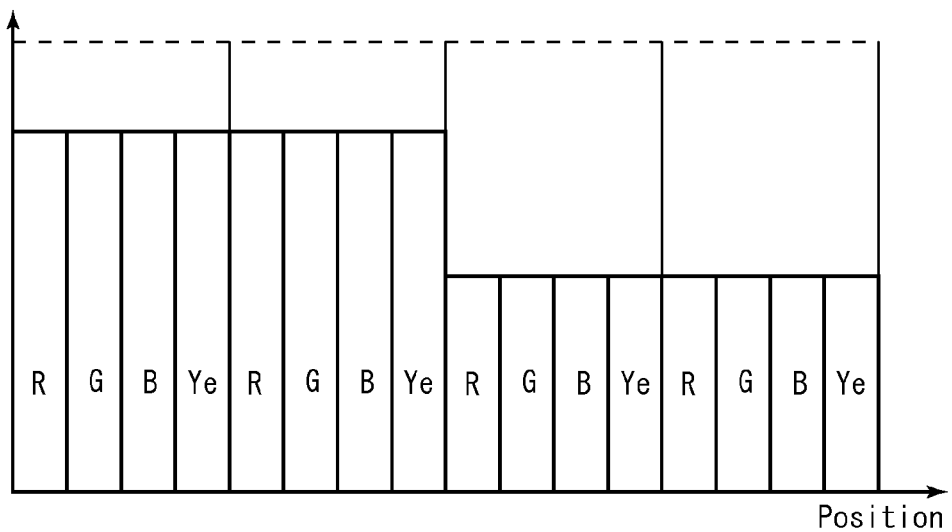
FIG. 8B shows exemplary RGBYe signals generated from the RGB input signals in the image processing circuit according to Embodiment 1.

The RGB signals of the three colors shown in FIG. 8A are converted by the principal color conversion section 41 into the RGBYe signal of four colors shown in FIG. 8B. Respective pixel values of the RGBYe components obtained herein are the same values as the pixel values of the RGB components of the input RGB signals.

Figure 8C:
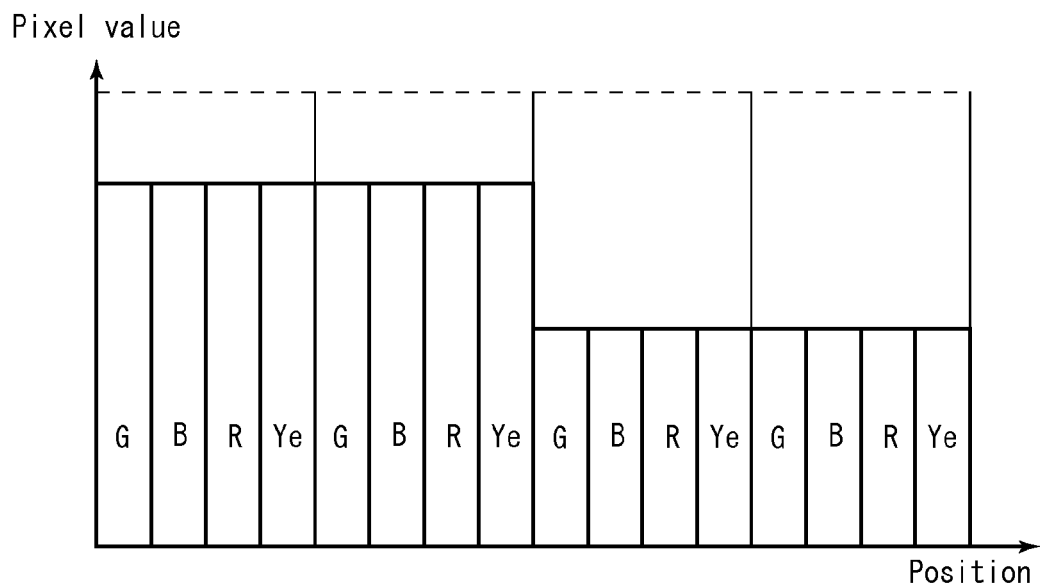
FIG. 8C shows a result of re-arrangement of the signals shown in FIG. 8B, according to the arrangement order of sub-pixels in a display panel, in the image processing circuit according to Embodiment 1.

Next, the sub-pixel arrangement conversion part 421 re-arranges the RGBYe signals fed from the principal color conversion section 41, in the same order as the order in which the sub-pixels are arranged on the display panel 500. In the case of the present embodiment, the order of the sub-pixels arranged on the display panel 500 is the order of G, B, R, and Ye as shown in FIGS. 1 to 3. Therefore, the sub-pixel arrangement conversion part 421 re-arranges the RGBYe signals fed thereto, in the order of G, B, R, and Ye, as shown in FIG. 8C.

Next, a minimum value among sub-pixel values in one pixel is extracted as a monochromatic component by the monochromatic component extractor 422a. In this example, since the input is a monochromatic signal, the monochromatic component has the same value as the pixel value of the RGBYe signal fed thereto.

Next, the high-pass filter 422*b* extracts high-frequency components out of the monochromatic components thus obtained as mentioned above. Here, the high-pass filter 422*b* receives the signals corresponding respective sub-pixels in which the RGBYe signals are re-arranged in the order of G, B, R, and Ye, determines variation of signal values sub-pixel by sub-pixel, and extracts high-frequency components.

Figure 8D:
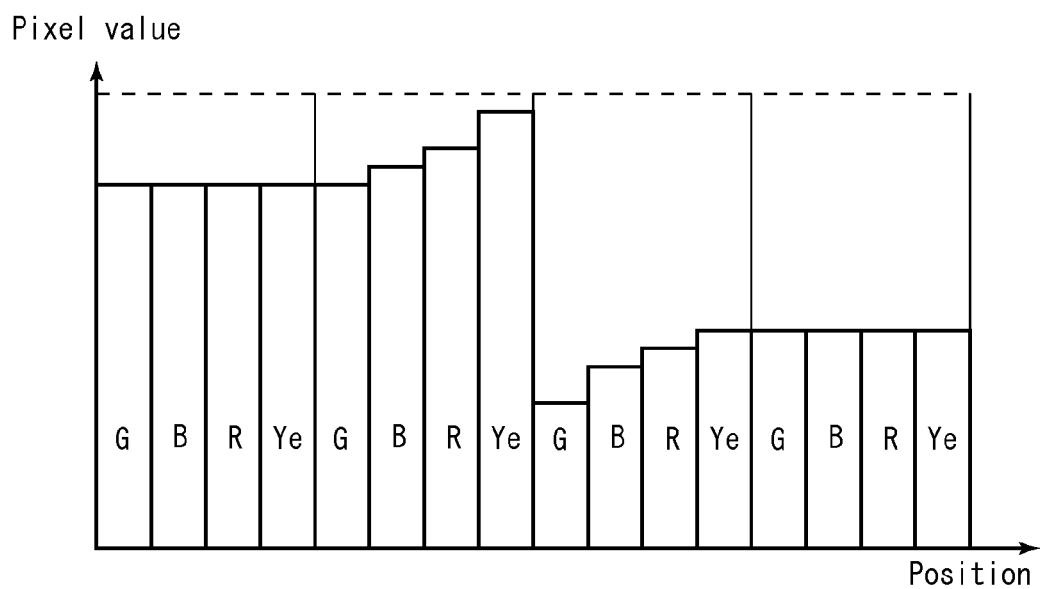
FIG. 8D shows a result of enhancement of high-frequency components of the signals shown in FIG. 8C, in the image processing circuit according to Embodiment 1.

The adder 422*c* adds the high-frequency components extracted by the high-pass filter 422*b*, and the monochromatic components. With this, a signal in which the high-frequency components are enhanced sub-pixel by sub-pixel is obtained, as an output from the adder 422*c*, as shown in FIG. 8D. It should be noted that in this example, since the output from the subtractor 422*d* is zero, the output from the adder 422*e* is equal to the output from the adder 422*c*. The PQST signal output from the adder 422*e* is converted by the sub-pixel arrangement reverse conversion part 423 into the original order of RGBYe, and is output.

As described above, with the image processing circuit 40 according to the present embodiment, a signal in which high-frequency components are enhanced sub-pixel by sub-pixel can be obtained. Therefore, a high-definition enhancement processing is realized.

Next, a case where input signals fed to the image processing circuit 40 are color signals is explained, with reference to FIGS. 9A to 9F.

Figure 9A:
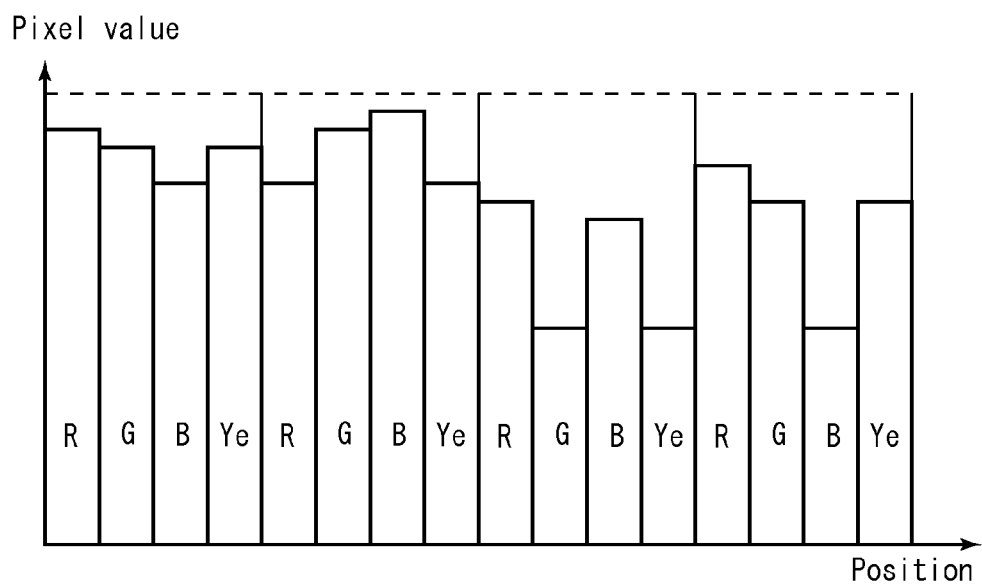
FIG. 9A shows exemplary RGBYe signals generated from RGB input signals (color signals), in the image processing circuit according to Embodiment 1.
Figure 9B:
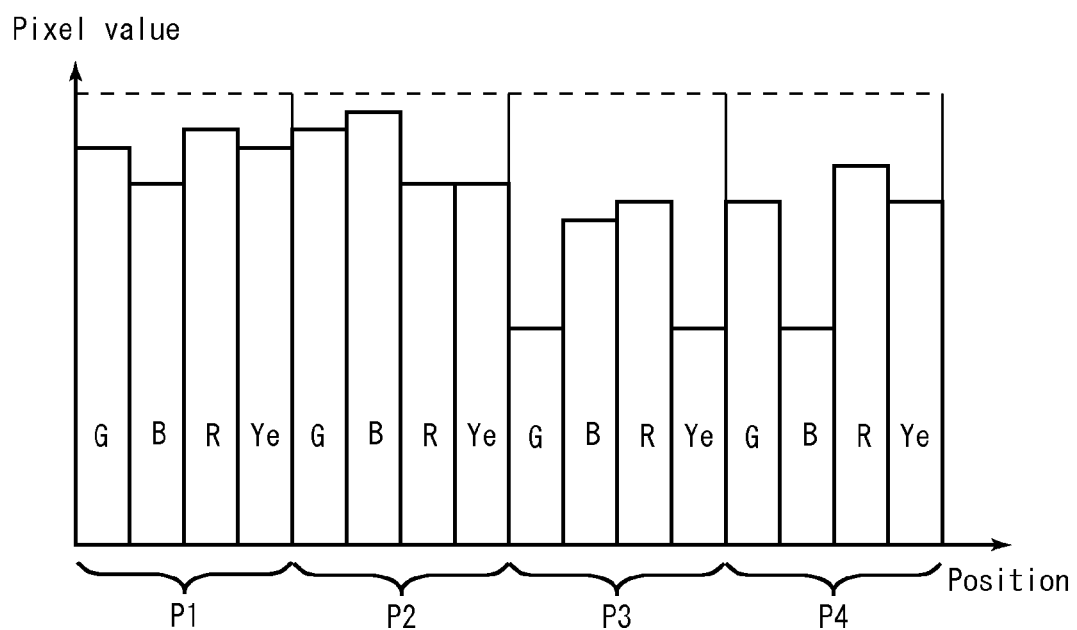
FIG. 9B shows a result of re-arrangement of the signals shown in FIG. 9A, according to the arrangement order of sub-pixels in the display panel.

In this case as well, as shown in FIGS. 9A and 9B, the sub-pixel arrangement conversion part 421 re-arranges the RGBYe signals fed from the principal color conversion section 41, in the same order as the order in which the sub-pixels are arranged on the display panel 500 (the order of G, B, R, and Ye).

Figure 9C:
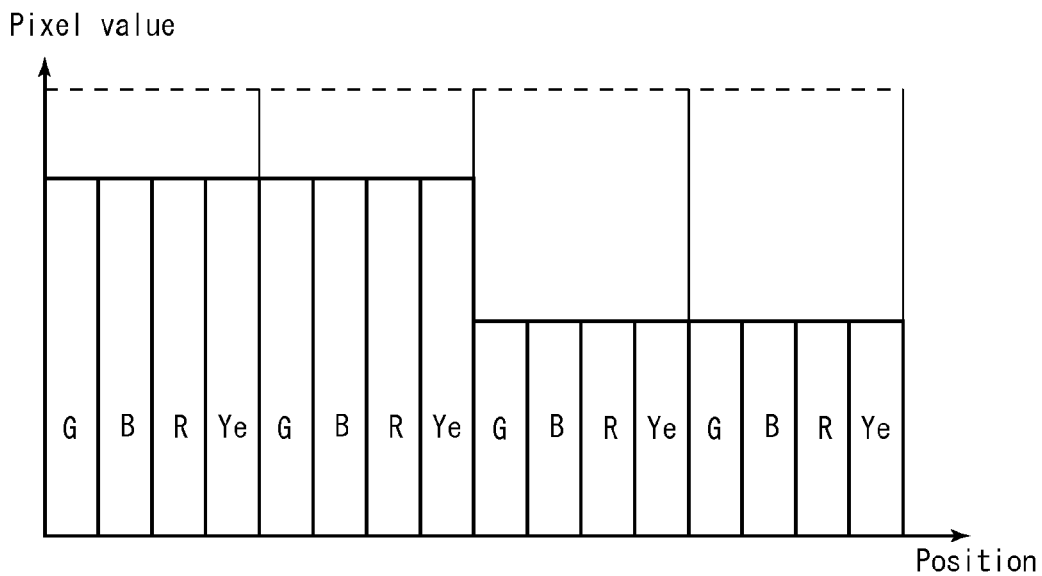
FIG. 9C shows monochromatic components obtained from the signals shown in FIG. 9B.

Next, a minimum value among sub-pixel values in one pixel is extracted as monochromatic components by the monochromatic component extractor 422*a*. Thus, the monochromatic components shown in FIG. 9C are extracted pixel by pixel. For example, in a pixel P1 shown in FIG. 9B, the sub-pixel of blue has a pixel value as the minimum value in the pixel. Therefore, this pixel value is extracted as monochromatic components. Likewise, in a pixel P2, a pixel value of sub-pixels of red and yellow is extracted as monochromatic components; in a pixel P3, a pixel value of sub-pixels of green and yellow is extracted as monochromatic components; and in a pixel P4, a pixel value of a sub-pixel of blue is extracted as monochromatic components.

Figure 9D:
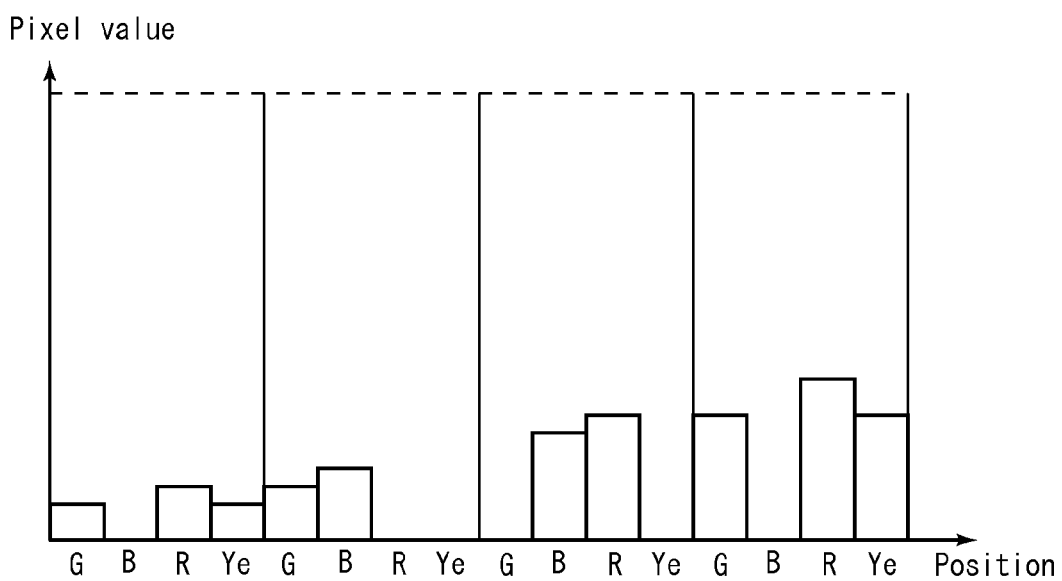
FIG. 9D shows color components obtained from the signals shown in FIG. 9B.

The monochromatic components extracted by the monochromatic component extractor 422*a* are fed to the subtractor 422*d*. The subtractor 422*d* subtracts the monochromatic components from the PQST signals, whereby the color components shown in FIG. 9D are obtained as an output from the subtractor 422*d*.

Figure 9E:
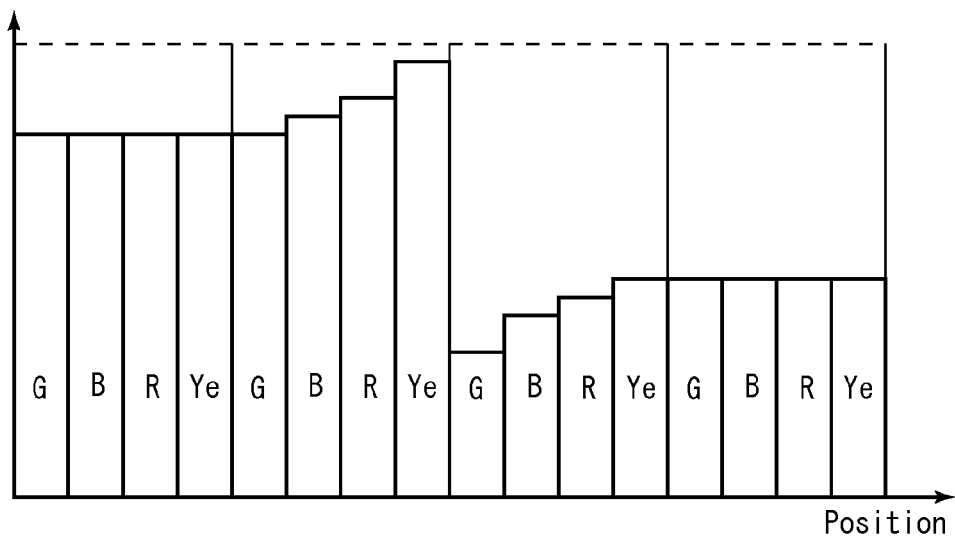
FIG. 9E shows results obtained by enhancement of high-frequency components of the monochromatic components shown in FIG. 9C.

Next, the high-pass filter 422*b* extracts high-frequency components from the monochromatic components obtained by the monochromatic component extractor 422*a*. The adder 422*c* adds the high-frequency components extracted by the high-pass filter 422*b* and the monochromatic components. Thus, a signal (monochromatic components) in which the high-frequency components are enhanced sub-pixel by sub-pixel as shown in FIG. 9E is obtained as an output of the adder 422.

Figure 9F:
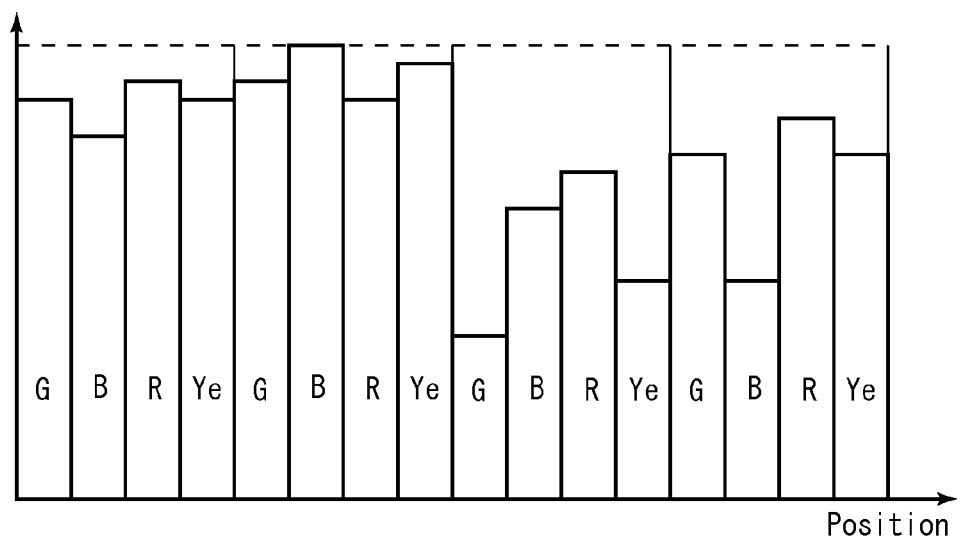
FIG. 9F shows a result of obtained by addition of the signals shown in FIG. 9E and the color components shown in FIG. 9D.

Then, the output from the adder 422*c*, that is, the monochromatic components in which the high-frequency components are enhanced (FIG. 9E), and the output from the subtractor 422*d*, that is, the color components (FIG. 9D), are added by the adder 422*e*, whereby output signals in which the high-frequency components are enhanced sub-pixel by sub-pixel can be obtained, as shown in FIG. 9F. The PQST signal output from the adder 422*e* is converted by the sub-pixel arrangement reverse conversion part 423 into the original order of R, G, B, and Ye, and is output.

As described above, with the image processing circuit 40 according to the present embodiment, signals in which high-frequency components are enhanced sub-pixel by sub-pixel can be obtained as well, even in the case where the input image signal is a color signal. Therefore, a high-definition enhancement processing is realized.

Besides, with the image processing circuit 40 according to the present embodiment, enhancement processing by the high-pass filter 422*b* and the adder 422*c* is performed only with respect to the monochromatic components extracted by the monochromatic component extractor 422*a*. Therefore, even in the case where enhancement processing is performed with respect to color signals, a hue change due to the enhancement processing can be reduced to minimum.

Particularly in the case where a pure color such as a principal color R, G, or B, or a complementary color C, M, or Ye is input as an input signal to the image processing circuit 40, the minimum value among the sub-pixels values is zero. Therefore, the monochromatic components output from the monochromatic component extractor 422*a* become zero. Therefore, in this case, the enhancement processing by the high-pass filter 422*b* and the adder 422*c* does not work, and consequently an advantage that the occurrence of color running or hue change can be avoided can be achieved.

Embodiment 2

The following description explains Embodiment 2 of the present invention.

Figure 10:
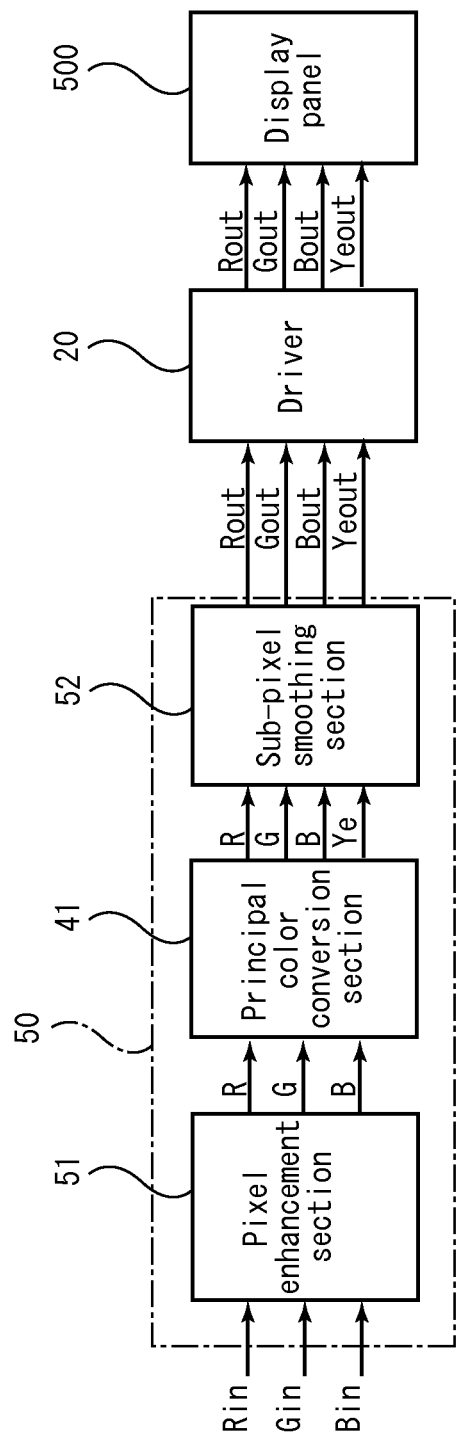
FIG. 10 is a block diagram showing a schematic configuration of a liquid crystal display device according to Embodiment 2.

FIG. 10 is a block diagram showing a schematic configuration of a liquid crystal display device according to Embodiment 2. It should be noted that the members having the same functions as those of the members explained in the description of Embodiment 1 are denoted by the same reference numerals as those in Embodiment 1, and explanations of the same are omitted herein.

As shown in FIG. 10, a liquid crystal display device according to Embodiment 2 includes an image processing circuit 50 that receives image signals Rin, Gin, and Bin of the three principal colors of R, G, and B, and outputs image signals Rout, Gout, Bout, and Yeout of the four colors of R, G, B, and Ye, as an image processing device that supplies image signals to the display panel 500.

It should be noted that the image processing circuit 50 of the present embodiment performs conversion processing of converting image signals of the three principal colors into image signals of the four colors, as is the case with the image processing circuit 40, which is explained in the description of Embodiment 1. While the image processing circuit 40 of Embodiment 1 has a configuration of performing the contour enhancement processing sub-pixel by sub-pixel, however, the image processing circuit 50 performs contour enhancement processing pixel by pixel first, and thereafter performs smoothing processing sub-pixel by sub-pixel. It should be noted that the smoothing processing is processing of removing high frequency noises so as to smoothen changes in pixel values.

Therefore, as shown in FIG. 10, the image processing circuit 50 includes a pixel enhancement section 51, a principal color conversion section 41, and a sub-pixel smoothing section 52. The pixel enhancement section 51 performs contour enhancement processing pixel by pixel, which will be explained in detail later. On the other hand, the sub-pixel smoothing section 52 performs smoothing processing sub-pixel by sub-pixel, which also will be described in detail later.

Figure 11:
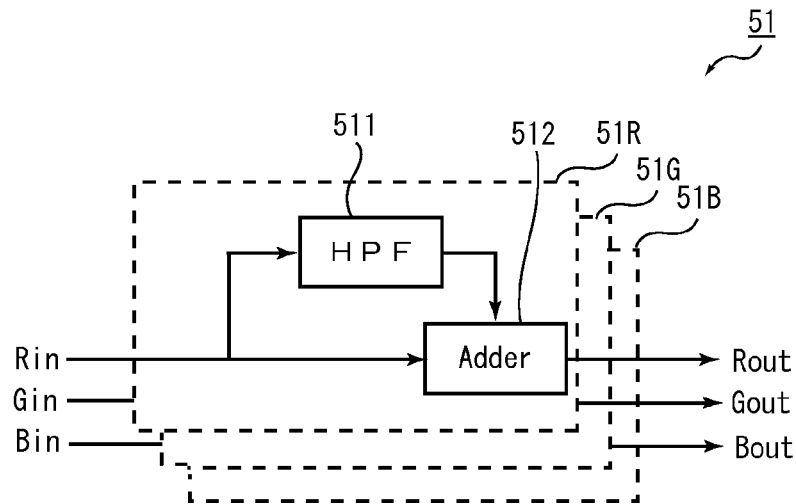
FIG. 11 is a block diagram showing an exemplary schematic configuration of a pixel enhancement section shown in FIG. 10.
Figure 12:
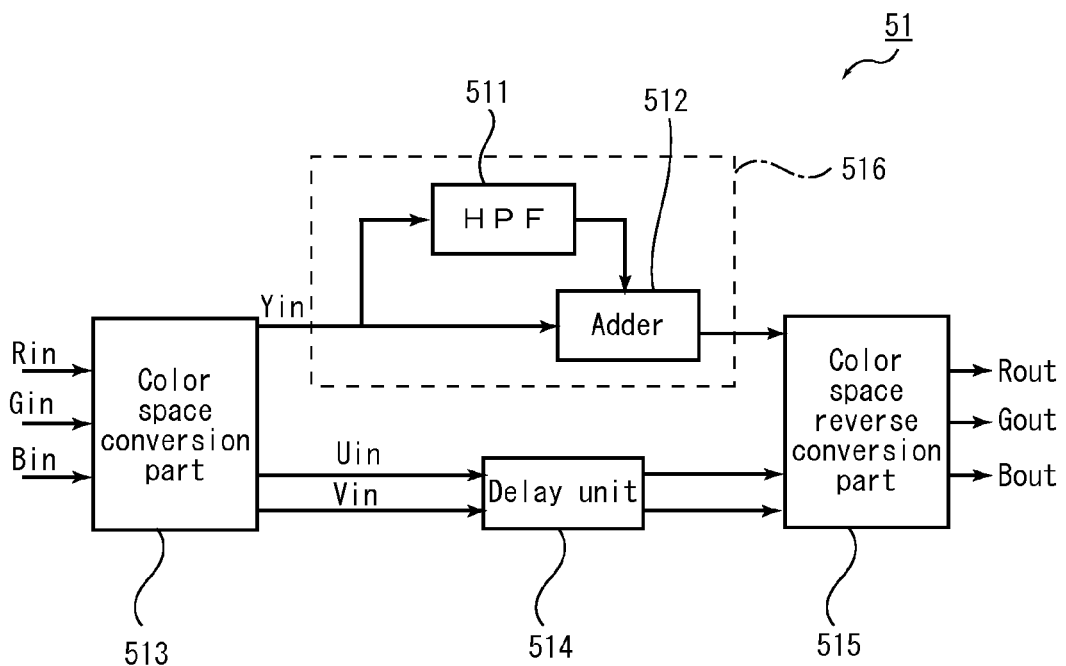
FIG. 12 is a block diagram showing another exemplary schematic configuration of the pixel enhancement section shown in FIG. 10.

FIGS. 11 and 12 show two specific exemplary configurations of the pixel enhancement section 51.

In the exemplary configuration shown in FIG. 11, there are provided a red-pixel high-pass filter part 51R, a green-pixel high-pass filter part 51G, and a blue-pixel high-pass filter part 51B, corresponding to the image signals Rin, Gin, and Gin of the three colors of R, G, and B, respectively. The red-pixel high-pass filter part 51R includes a high-pass filter 511 and an adder 512. The green-pixel high-pass filter part 51G and the blue-pixel high-pass filter part 51B have the same configuration as the red-pixel high-pass filter part 51R does.

The high-pass filter 511 of the red-pixel high-pass filter part 51R extracts high-frequency components out of the image signal Rin. The high-frequency components thus extracted are added to the original image signal Rin by the adder 512, whereby the high-frequency components of the image signal Rin are enhanced.

On the other hand, in the exemplary configuration shown in FIG. 12, the pixel enhancement section 51 includes a high-pass filter part 516 having a high-pass filter 511 and an adder 512, a color space conversion part 513, a delay unit 514, and a color space reverse conversion part 515.

The color space conversion part 513 divides the RGB input signals into a brightness signal Yin as well as color-difference signals Uin and Vin. Only the brightness signal Yin is fed to the high-pass filter part 516, and high-frequency components of the same are enhanced. The color difference signals Uin and Vin are delayed by the delay unit 514 for a time required for the enhancement processing at the high-pass filter part 516, and are output to the color space reverse conversion part 515. The color space reverse conversion part 515 receives the brightness signal Yin having high-frequency components enhanced, and the color difference signals Uin and Vin thus delayed, and reversely converts these into the RGB input signal form.

The configuration shown in FIG. 11 requires three sets of the high-pass filter 511 and the adder 512, but the configuration shown in FIG. 12 requires only one set of the high-pass filter 511 and the adder 512. Therefore, in the configuration shown in FIG. 12, the circuit size of the high-pass filter part is about one third, as compared with the configuration shown in FIG. 11. Thus, the configuration shown in FIG. 12 allows the circuit size of the pixel enhancement section 51 to be reduced. Besides, in the configuration shown in FIG. 12, only the brightness signal Yin is extracted and subjected to the enhancement processing, whereby the effect of suppressing hue changes can be achieved.

It should be noted that in the pixel enhancement section 51 shown in FIGS. 11 and 12, the enhancement processing is carried out by the adder 512 simply adding high-frequency components extracted from an original signal by the high-pass filter 511 and the original signal. However, the method of enhancement processing is not limited to this. For example, the configuration may be as follows: high frequency components extracted by the high-pass filter 511 are subjected to gain processing or the like, and thereafter, they are added with the original signal.

Figure 13:
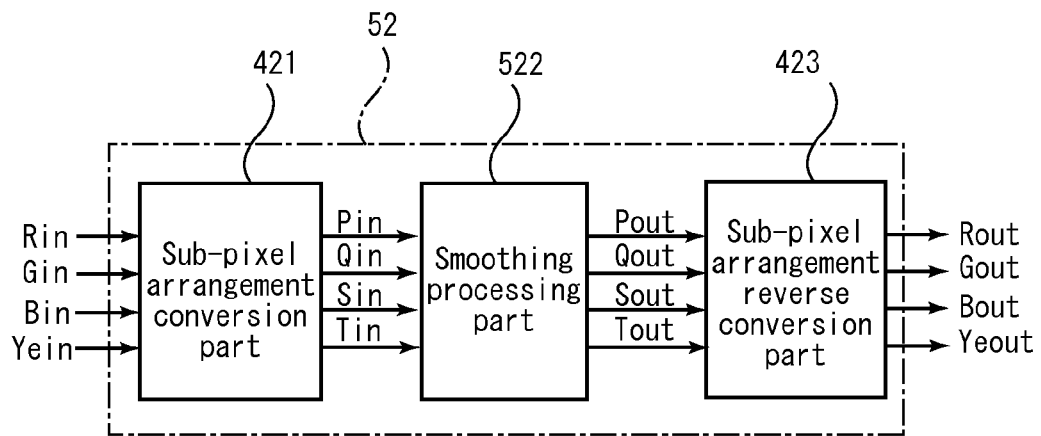
FIG. 13 is a block diagram showing a schematic configuration of a sub-pixel smoothing section provided in an image processing circuit shown in FIG. 10.

Next, the following description explains a configuration and an operation of the sub-pixel smoothing section 52. FIG. 13 is a block diagram showing a schematic configuration of the sub-pixel smoothing section 52.

As shown in FIG. 13, the sub-pixel smoothing section 52 includes a sub-pixel arrangement conversion part 421, a smoothing processing part 522, and a sub-pixel arrangement reverse conversion part 423. The functions of the sub-pixel arrangement conversion part 421 and the sub-pixel arrangement reverse conversion part 423 are identical to those in Embodiment 1, and therefore the explanation of the same is not repeated herein. The smoothing processing part 522 performs processing of smoothing an output from the sub-pixel arrangement conversion part 421 sub-pixel by sub-pixel.

Figure 14:
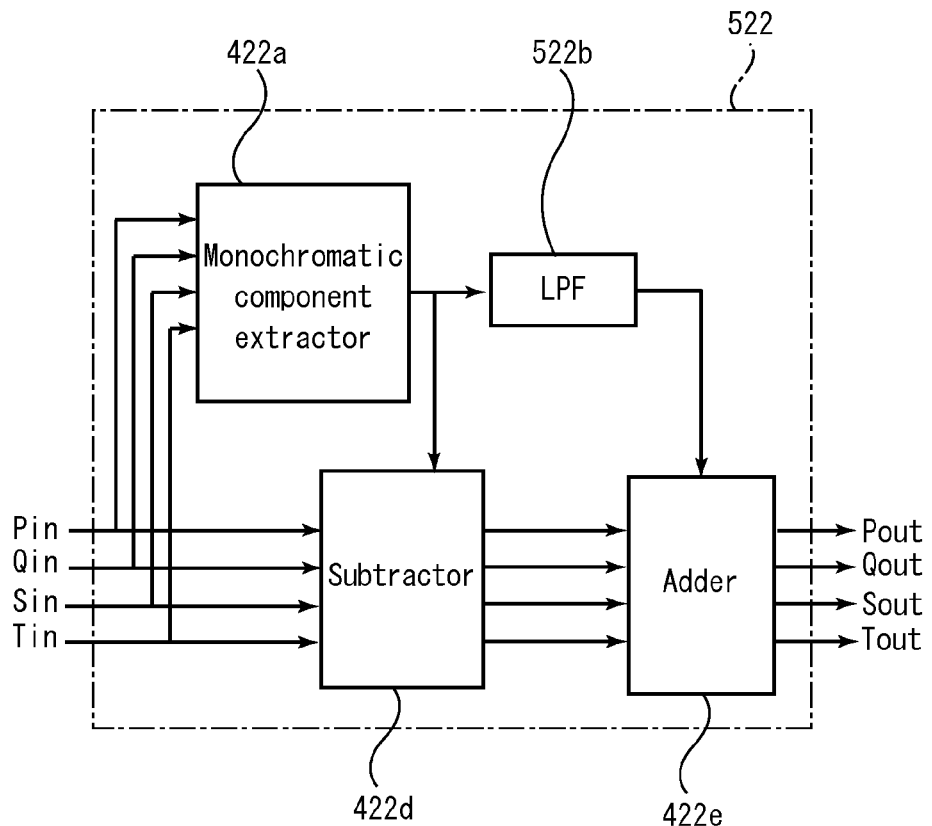
FIG. 14 is a block diagram showing a schematic configuration of a smoothing processing part shown in FIG. 13.

FIG. 14 is a block diagram showing a configuration of the smoothing processing part 522. As shown in FIG. 14, the smoothing processing part 522 includes a monochromatic component extractor 422a, a low-pass filter (LPF) 522b, a subtractor 422d, and adder 422e. In other words, the sub-pixel smoothing section 52 is equivalent to the configuration of the enhancement processing part 422 of embodiment 1 in which the high-pass filter 422h (the high-pass filter 422b and the adder 422c) is replaced with the low-pass filter 522b. The explanation of the monochromatic component extractor 422a and the like is not repeated herein.

The low-pass filter 522b extracts low-frequency components sub-pixel by sub-pixel, from the monochromatic components extracted by the monochromatic component extractor 422a. The subtractor 422d subtracts the monochromatic components from the PQST signals. Thus, the output of the subtractor 422d is color components extracted from the PQST signals. The adder 422e adds output signals of the subtractor 422d and output signals of the low-pass filter 522b.

It should be noted that in the smoothing processing part 522 shown in FIG. 14, low-frequency components extracted by the low-pass filter 522b are fed without any change to the adder 422e. The method of the smoothing processing, however, is not limited to this. For example, the configuration may be as follows: low-frequency components extracted by the low-pass filter 522b are subjected to gain processing or the like, and thereafter, they are added with color components by the adder 422e.

Here, the following description explains an effect of the processing by the image processing circuit 50 of the present embodiment, while referring to specific examples.

Figure 15A:
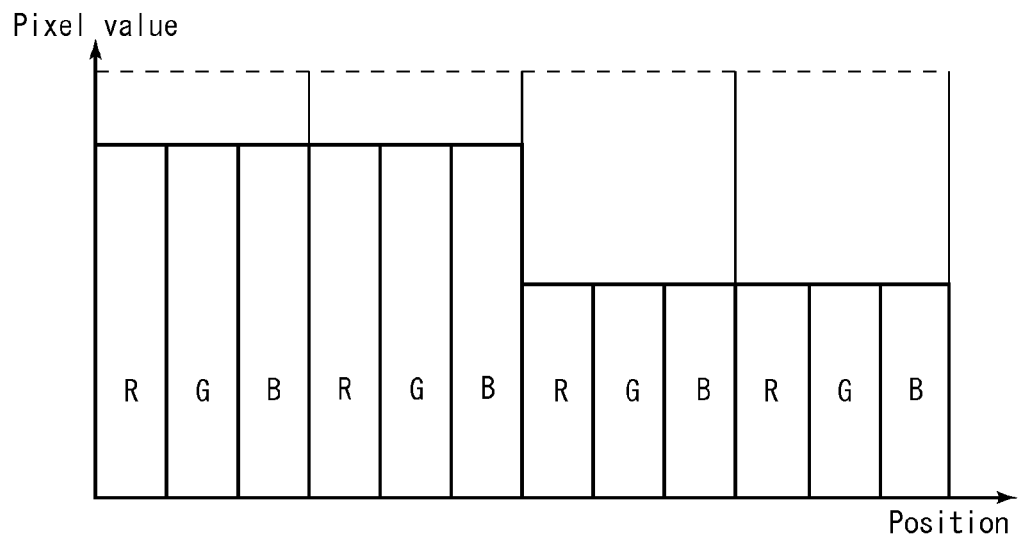
FIG. 15A shows exemplary RGB input signals (monochromatic signals) to be fed to the image processing circuit according to Embodiment 2.

Here, a case where input signals to the image processing circuit 50 are monochromatic signals is explained, with reference to FIGS. 15A to 15E. It should be noted that in the case where input signals are monochromatic signals, the respective components of R, G, and B of input signals have the same values, as shown in FIG. 15A.

Figure 15B:
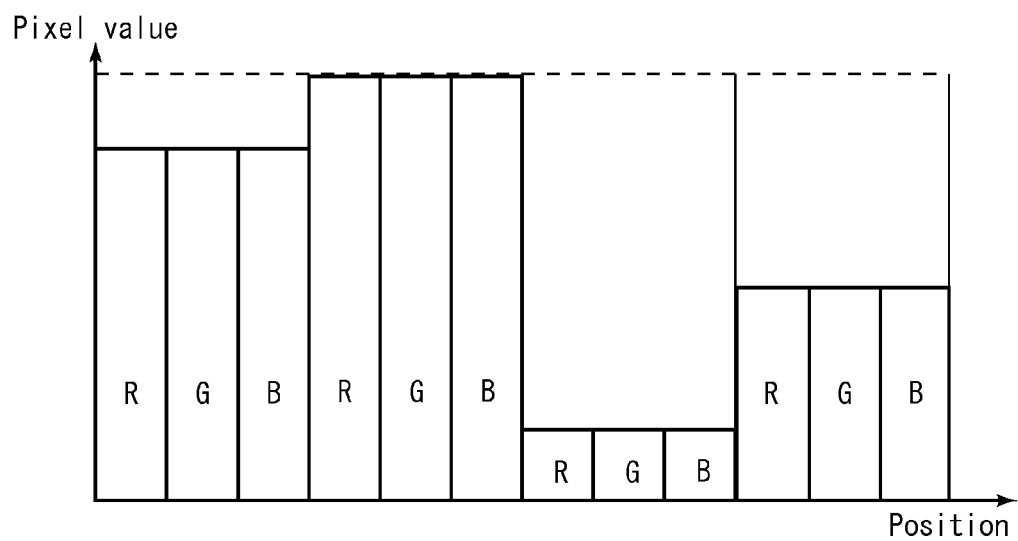
FIG. 15B shows a result of pixel-by-pixel enhancement with respect to the signals shown in FIG. 15A.
Figure 15C:
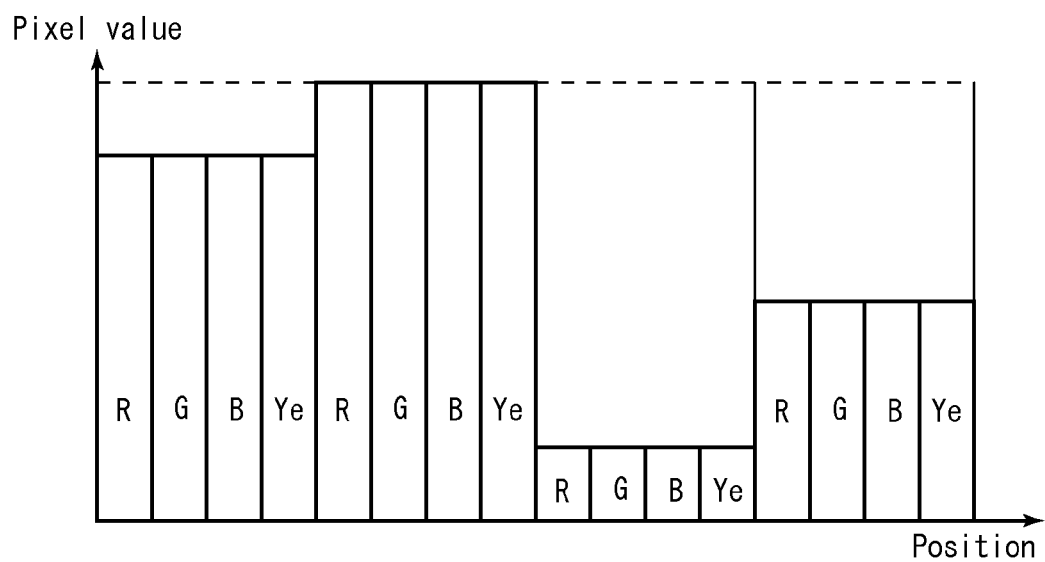
FIG. 15C shows exemplary RGBYe signals generated from the RGB signals shown in FIG. 15B.

First, the pixel enhancement section 51 performs the enhancement processing pixel by pixel with respect to RGB input signals of the three colors shown in FIG. 15A. This causes high-frequency components of the RGB input signals to be enhanced, thereby obtaining enhancement signals as shown in FIG. 15B, for example. Next, the principal conversion section 41 generates RGBYe signals of the four colors as shown in FIG. 15C, from the RGB signals shown in FIG. 15B.

Figure 15D:
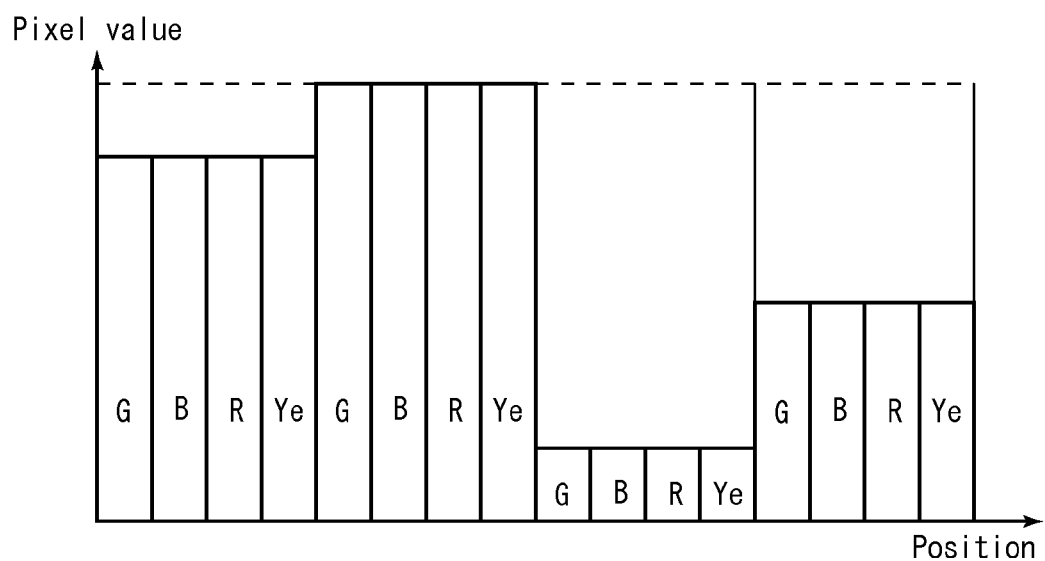
FIG. 15D shows a result of re-arrangement of the signals shown in FIG. 15C, according to the arrangement order of sub-pixels in a display panel.

Next, the sub-pixel arrangement conversion part 421 re-arranges the RGBYe signals fed from the principal color conversion section 41, in the same order as the order in which the sub-pixels are arranged on the display panel 500. In the case of the present embodiment, the sub-pixel arrangement conversion part 421 re-arranges the RGBYe signals thus fed thereto, in the order of G, B, R, and Ye, as shown in FIG. 15D.

Next, a minimum value among sub-pixel values in one pixel is extracted as monochromatic components by the monochromatic component extractor 422a. In this example, since the input is monochromatic signals, the monochromatic components have the same values as the pixel values of the RGBYe signals fed thereto.

Next, the low-pass filter 522b extracts low-frequency components sub-pixel by sub-pixel, out of the monochromatic components thus obtained as mentioned above. This allows smooth monochromatic components from which high-frequency components becoming noises are removed sub-pixel by sub-pixel to be obtained as an output of the low-pass filter 522b. It should be noted that in this example, since the output from the subtractor 422d is zero, the output from the adder 422e is equal to the output from the low-pass filter 522b. The PQST signals output from the adder 422e are converted by the sub-pixel arrangement reverse conversion part 423 into the original order of R, G, B, and Ye, and are output.

Figure 15E:
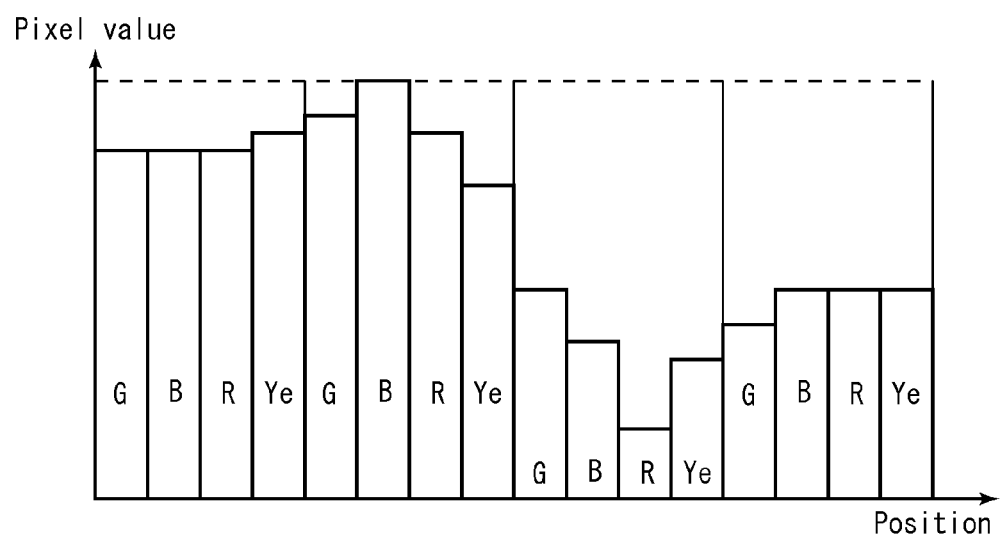
FIG. 15E shows a result of a smoothing processing with respect to the signals shown in FIG. 15D.

With the above-described processing, signals form which high-frequency components becoming noises are removed can be obtained by the image processing circuit 50 according to the present embodiment, sub-pixel by sub-pixel. Besides, as shown in FIG. 15E, with the image processing circuit 50 of the present embodiment, sharp enhancement processing cannot be performed with respect to edges of each pixel, unlike the result (FIG. 8D) of the processing by the image processing circuit 40 of Embodiment 1. However, as is clear from the comparison between FIGS. 15B and 15E, the image processing circuit 50 makes it possible to generate sub-pixel-level fine decreases/increases, as compared with the signals (FIG. 15B) at a stage where only the contour enhancement is performed pixel by pixel. In other words, the image processing circuit 50 is capable of generating smooth enhancement signals sub-pixel by sub-pixel.

It should be noted that smooth enhancement signals can be generated sub-pixel by sub-pixel also in the case where the input signals are color signals, as is the case with monochromatic signals. Therefore, explanation of the same is omitted herein.

Embodiment 3

The following description explains Embodiment 3 of the present invention.

Figure 16:
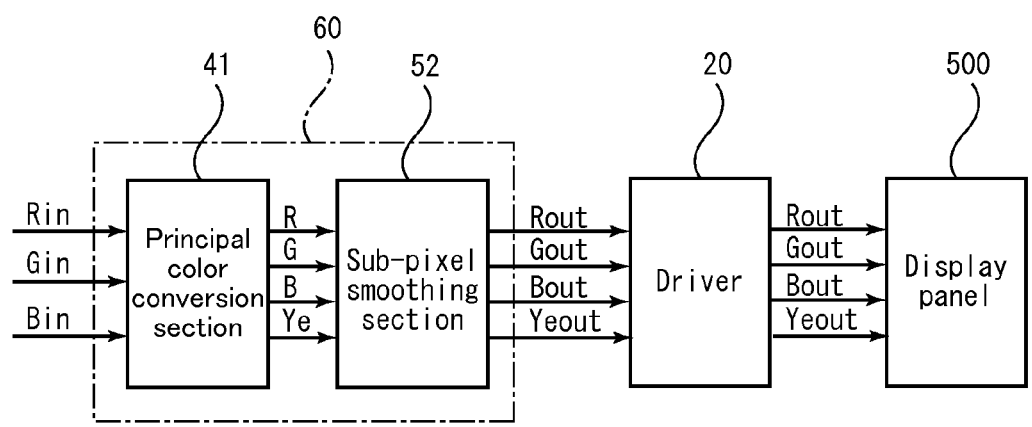
FIG. 16 is a block diagram showing a schematic configuration of a liquid crystal display device according to Embodiment 3.

FIG. 16 is a block diagram showing a schematic configuration of a liquid crystal display device according to Embodiment 3. As shown in FIG. 16, the liquid crystal display device according to embodiment 3 includes an image processing circuit 60 that receives image signals Rin, Gin, and Bin of the three principal colors of R, G, and B, and outputs image signals Rout, Gout, Bout, and Yeout of the four colors of R, G, B, and Ye, as an image processing device that supplies image signals to the display panel 500. It should be noted that the image processing circuit 60 of the present embodiment performs conversion processing of converting image signals of the three principal colors into image signals of the four colors, and also performs smoothing processing of removing high-frequency noises so as to smoothen changes in pixel values, as is the case with the image processing circuit 50 of Embodiment 2. However, the image processing circuit 60 of the present embodiment is different from the image processing circuit 50 of Embodiment 2 in the point that the former does not include the pixel enhancement section 51. In other words, while the image processing circuit 50 according to Embodiment 2 realizes a smooth sub-pixel-level contour enhancement processing, the image processing circuit 60 of the present embodiment realizes a sub-pixel-level smoothing processing.

More specifically, the image processing circuit 60 includes a principal color conversion section 41, and a sub-pixel smoothing section 52. The configurations and functions of the principal color conversion section 41 and sub-pixel smoothing section 52 are as explained in the above descriptions of Embodiments.

With this configuration, the image processing circuit 60 converts input signals of the three colors of R, G, and B into image signals of the four colors of R, G, B, and Ye at the principal color conversion section 41, and thereafter performs sub-pixel-level smoothing processing at the sub-pixel smoothing section 52. This makes it possible to make pixel-level changes in images finer to the sub-pixel level, and to generate smooth signals having a sub-pixel-level resolution.

Here, effects of the processing by the image processing circuit 60 are explained with reference to FIGS. 17A to 17D. Since herein also there is no difference in effects depending on whether the input signals are color signals or monochromatic signals, a case where monochromatic signals are input is assumed in the explanation.

Figure 17A:
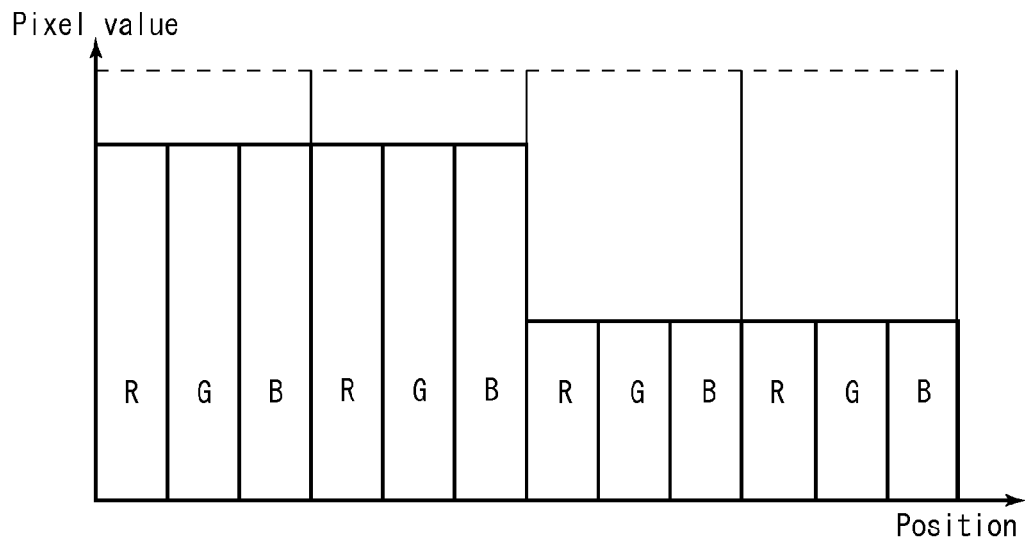
FIG. 17A shows exemplary RGB input signals (monochromatic signals) to be fed to an image processing circuit according to Embodiment 3.
Figure 17B:
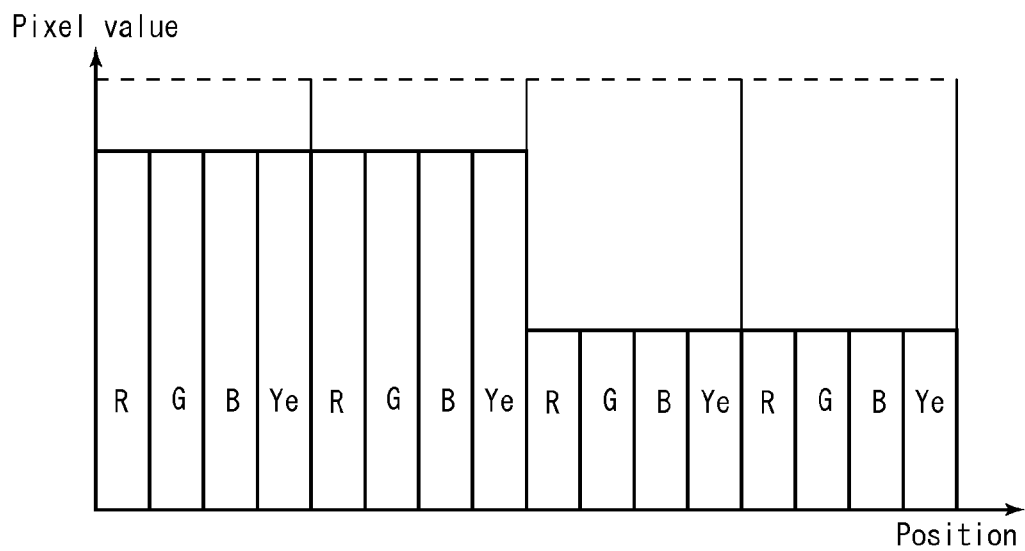
FIG. 17B shows exemplary RGBYe signals generated from the RGB signals shown in FIG. 17A.

First, RGB input signals of the three colors as shown in FIG. 17A are converted into RGBYe signals of the four colors as shown in FIG. 17B, by the principal color conversion section 41.

Figure 17C:
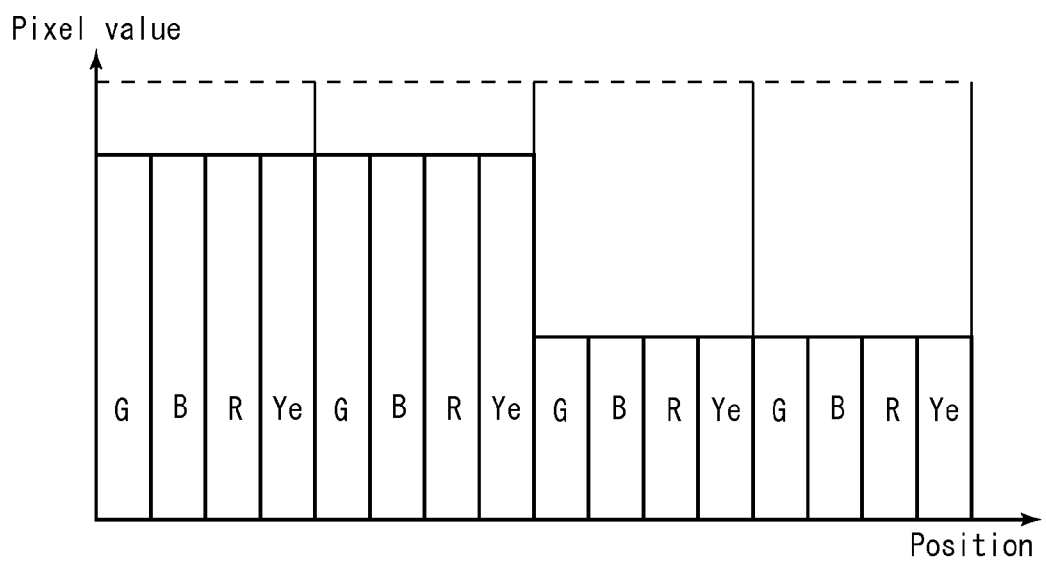
FIG. 17C shows a result of re-arrangement of the signals shown in FIG. 17B, according to the arrangement order of sub-pixels in a display panel.
Figure 17D:
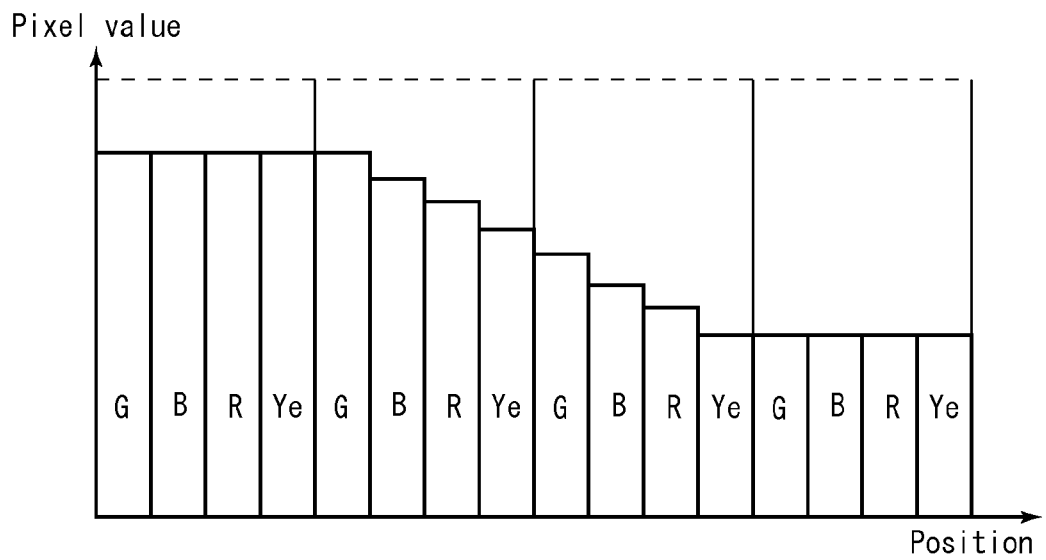
FIG. 17D shows a result of smoothing processing with respect to the signals shown in FIG. 17C.

Next, the sub-pixel arrangement conversion section 421 re-arrange the RGBYe signals fed from the principal color conversion section 41, into the same order as the sub-pixel arrangement on the display panel 500. In the case of the present embodiment, the sub-pixel arrangement conversion section 421 re-arranges the RGBYe signals fed thereto into an order of G, B, R, and Ye as shown in FIG. 17C.

Next, the monochromatic component extraction section 422a extracts a minimum value among sub-pixel values in one pixel as a monochromatic component. In this example, since the input is monochromatic signals, the monochromatic components have the same values as the pixel values of the RGBYe signals fed thereto.

Next, the monochromatic components obtained as described above are fed sequentially sub-pixel by sub-pixel to the low-pass filter 522b, and low-frequency components are extracted. This allows monochromatic components from which high-frequency components becoming noises are removed sub-pixel by sub-pixel to be obtained as an output of the low-pass filter 522b. It should be noted that in this example, since the output from the subtractor 422d is zero, the output from the adder 422e is equal to the output from the low-pass filter 522b. The PQST signals output from the adder 422e are converted by the sub-pixel arrangement reverse conversion part 423 into the original order of R, G, B, and Ye, and are output.

With the above-described processing, the following effects can be achieved by the image processing circuit 60 of the present embodiment. In the signals (monochromatic components) before the smoothing processing, the components of R, G, B, and Ye have the same values, and signal changes are limited to pixel-level changes, with the R, G, B, and Ye being taken as one unit. Therefore, by performing the smoothing processing sub-pixel by sub-pixel, signal changes are at the sub-pixel level with R, G, B, and Ye being independent from one another, whereby smooth gradation can be expressed.

Modifications of Embodiments 1 to 3

So far Embodiments 1 to 3 of the present invention have been explained, but the above-described embodiments are merely examples for embodying the present invention. Thus, the present invention is not limited to the above-described embodiments, and may be embodied by appropriately modifying the above-described various types of embodiments, within the scope of the spirit of the present invention.

For example, a configuration in which the sub-pixels are arranged in an order of G, B, R, and Ye as shown in FIGS. 1 to 3, for example, is shown in the above-described explanations, but the arrangement of the sub-pixels is not limited to this order, and may be arranged arbitrarily.

In the above-described explanation, an example in which the sub-pixel colors are four colors of R, G, B, and Ye, but the present invention can be also embodied as a display device having sub-pixel colors of five or more colors, and an image processing device used for the same.

It should be noted that an example in which the sub-pixels have uniform widths is shown in FIGS. 1 to 3, but the configuration may be such that the sub-pixels have different widths depending on the colors. Further, an example in which each pixel is divided into sub-pixels only in the horizontal direction is shown in FIGS. 1 to 3, but one pixel may be divided into sub-pixels in both of the horizontal and vertical directions. Still further, the shape of the sub-pixels is not limited to the rectangular shape.

Still further, in the case where the widths and areas of the sub-pixels are different depending on the sub-pixel color, the filter coefficient of the high-pass filter 422*b* or the low-pass filter 522*b* is preferably designed depending on the area of each sub-pixel.

Figure 18A:
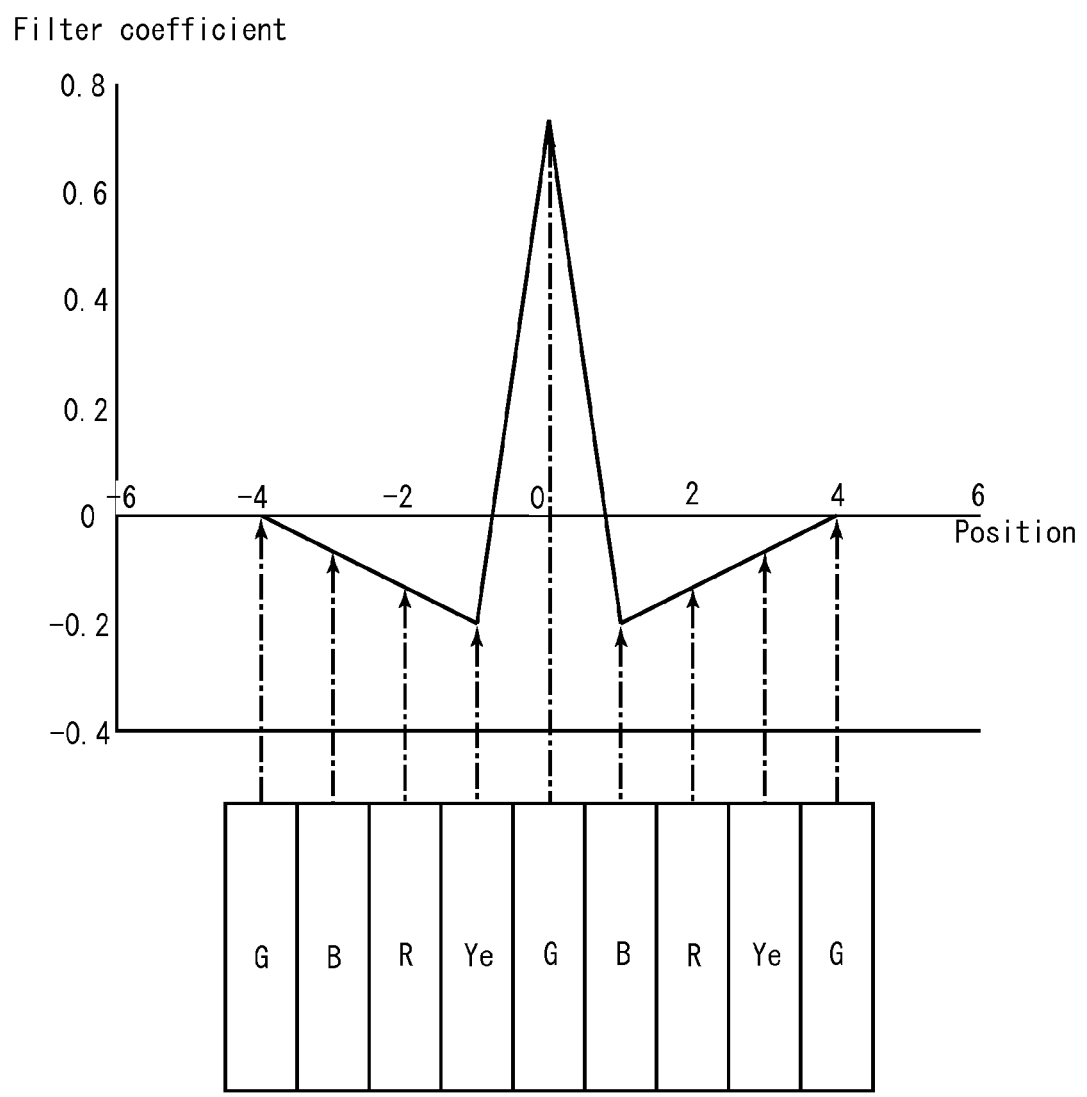
FIG. 18A schematically shows an exemplary method of determining a filter coefficient in the case where sub-pixels have uniform areas with respect to all pixel colors.
Figure 18B:
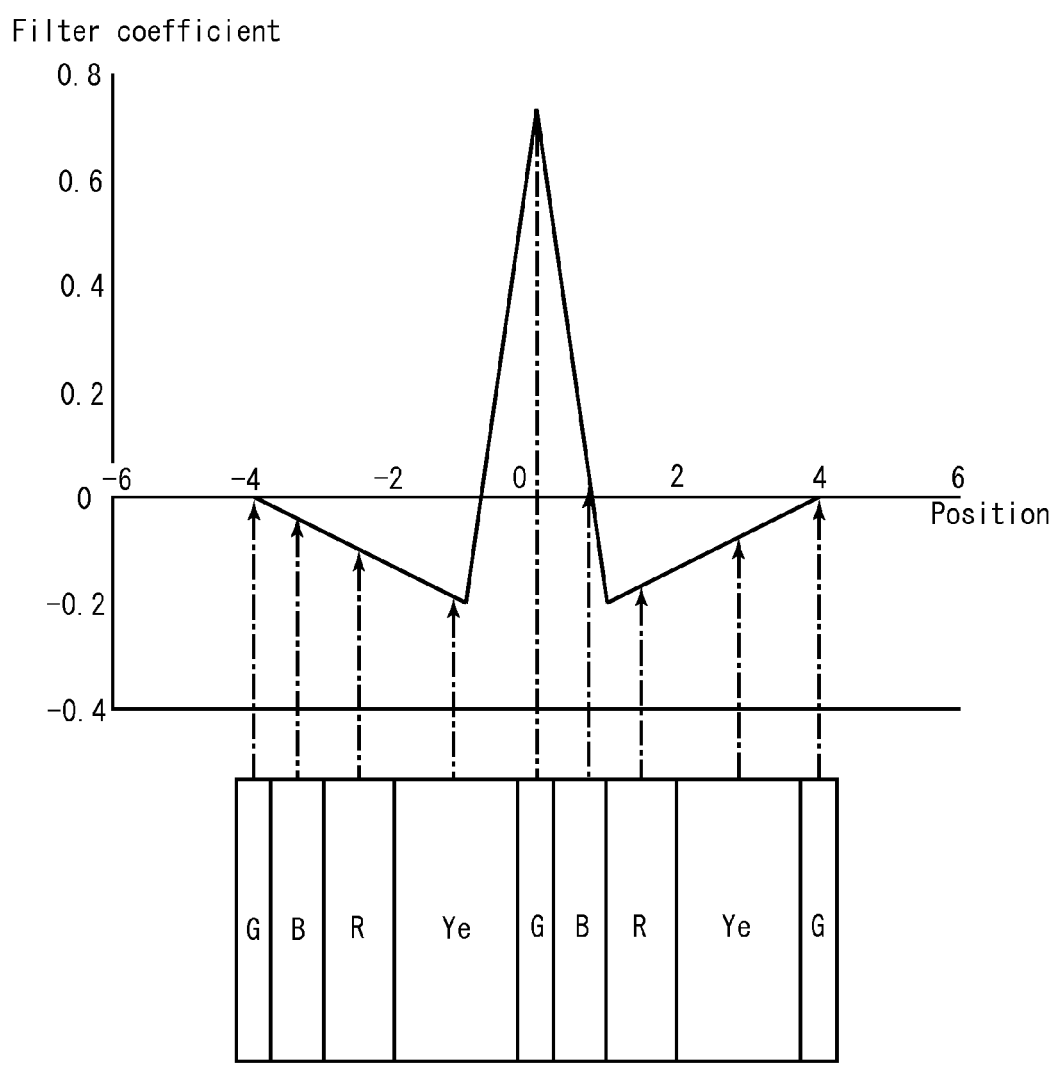
FIG. 18B schematically shows an exemplary method of determining a filter coefficient in the case where sub-pixels have different areas depending on pixel colors, respectively.

For example, FIGS. 18A and 18B show respective sampled points of filter coefficients in the case where the sub-pixels have uniform areas and in the case where the sub-pixels have non-uniform areas. I should be noted that FIGS. 18A and 18B show examples in the case where the high-pass filter has 7 taps, but these are merely examples.

In the case where the sub-pixels have uniform areas, a filter coefficient can be determined by referring to values at evenly sampled points in a filter function, as shown in FIG. 18A. On the other hand, in the case where the sub-pixels have non-uniform areas, a filter coefficient is preferably determined by referring to values at unevenly sampled points in a filter function, as shown in FIG. 18B.

It should be noted that FIGS. 18A and 18B show examples in which center positions in the sub-pixels are used as sampled points of the filter function, but the method for determining the filter coefficient is not limited to such an example. For example, it is possible to use a sum of filter function values within a sub-pixel width as a filter coefficient.

Further, as Embodiments 1 to 3, cases where an image display device is embodied as a liquid crystal display device are shown. However, the image display device of the present invention is not limited to a liquid crystal display device, but it may be embodied as a display device of another type.

Further, the contour enhancement processing and the smoothing processing are shown as examples of the filtering processing in Embodiments 1 to 3. The filtering processing performed in the image display device of the present invention, however, is not limited to these, and characteristic extraction processing for extracting edges, lines, or the like of images, etc., can be applied.

INDUSTRIAL APPLICABILITY

The present invention is industrially applicable as an image display device including an image processing device that performs filtering processing with respect to input image signals.

The invention claimed is:

1. An image display device comprising:
    a display section in which color filters of sub-pixel colors including three principal colors of red, green, and blue as well as at least one color other than the three principal colors are arranged regularly; and
    an image processor configured to perform filtering processing with respect to an input image signal,
    wherein the image processor includes:
        a principal color conversion section configured to generate sub-pixel signals corresponding to the sub-pixel colors, respectively, from the input image signals of the three principal colors; and
        a sub-pixel processing section configured to give, to the sub-pixel signals, position information in accordance with an order of arrangement of the color filters of the sub-pixel colors in the display section, and perform the filtering processing sub-pixel by sub-pixel, and
    the sub-pixel processing section includes:
        a high-pass filter portion configured to perform high-frequency component enhancement processing; and
        a monochromatic component extractor configured to extract a minimum value among those of a plurality of sub-pixel signals belonging to one pixel as a monochromatic component, and output the extracted monochromatic component to the high-pass filter portion.

2. The image display device according to claim 1,
    wherein the color filters of the sub-pixel colors in the display section have uniform sizes, and
    a filter coefficient in the filtering processing in the sub-pixel processing section has a value at an evenly sampled point of a filter function.

3. The image display device according to claim 1,
    wherein the color filters of the sub-pixel colors in the display section have non-uniform sizes, and
    a filter coefficient in the filtering processing in the sub-pixel processing section has a value at an unevenly sampled point of a filter function.

4. The image display device according to claim 1, wherein the sub-pixel colors other than the three primary colors include at least one color selected from yellow; cyan; magenta; white; red having a chroma different from that of the red as the primary color; green having a chroma different from that of the green as the primary color; and blue having a chroma different from that of the blue as the primary color.

5. An image display device comprising:
    a display section in which color filters of sub-pixel colors including three principal colors of red, green, and blue as well as at least one color other than the three principal colors are arranged regularly; and
    an image processor configured to perform filtering processing with respect to an input image signal,
    wherein the image processor includes:
        a principal color conversion section configured to generate sub-pixel signals corresponding to the sub-pixel colors, respectively, from the input image signals of the three principal colors; and
        a sub-pixel processing section configured to give, to the sub-pixel signals, position information in accordance with an order of arrangement of the color filters of the sub-pixel colors in the display section, and perform the filtering processing sub-pixel by sub-pixel,
    the sub-pixel processing section includes a low-pass filter configured to perform smoothing processing; and
    the sub-pixel processing section further includes a monochromatic component extractor configured to extract a minimum value among those of a plurality of sub-pixel signals belonging to one pixel as a monochromatic component, and output the extracted monochromatic component to the low-pass filter.

6. The image display device according to claim 5,
wherein the color filters of the sub-pixel colors in the display section have uniform sizes, and
a filter coefficient in the filtering processing in the sub-pixel processing section has a value at an evenly sampled point of a filter function.

7. The image display device according to claim 5,
wherein the color filters of the sub-pixel colors in the display section have non-uniform sizes, and
a filter coefficient in the filtering processing in the sub-pixel processing section has a value at an unevenly sampled point of a filter function.

8. The image display device according to claim 5,
wherein the sub-pixel colors other than the three primary colors include at least one color selected from yellow; cyan; magenta; white; red having a chroma different from that of the red as the primary color; green having a chroma different from that of the green as the primary color; and blue having a chroma different from that of the blue as the primary color.

9. An image display device comprising:
a display section in which color filters of sub-pixel colors including three principal colors of red, green, and blue as well as at least one color other than the three principal colors are arranged regularly; and
an image processor configured to perform filtering processing with respect to an input image signal,
wherein the image processor includes:
  a principal color conversion section configured to generate sub-pixel signals corresponding to the sub-pixel colors, respectively, from the input image signals of the three principal colors; and
  a sub-pixel processing section configured to give, to the sub-pixel signals, position information in accordance with an order of arrangement of the color filters of the sub-pixel colors in the display section, and perform the filtering processing sub-pixel by sub-pixel,
the sub-pixel processing section includes:
  a low-pass filter configured to perform smoothing processing; and
  a pixel enhancement section configured to perform high-frequency component enhancement processing pixel by pixel, with respect to the input image signal of the three principal colors, and
the pixel enhancement section includes:
  a color space conversion part configured to divide the input image signal of the three principal colors into a brightness signal and a color-difference signal;
  a high-pass filter part configured to perform high-frequency component enhancement processing with respect to the brightness signal;
  a delay unit configured to delay the color-difference signal; and
  a color space reverse conversion part configured to receive an output from the high-pass filter part and an output from the delay unit, and convert the same into the same form as that of the input image signal of the three principal colors.

10. The image display device according to claim 9,
wherein the color filters of the sub-pixel colors in the display section have uniform sizes, and
a filter coefficient in the filtering processing in the sub-pixel processing section has a value at an evenly sampled point of a filter function.

11. The image display device according to claim 9,
wherein the color filters of the sub-pixel colors in the display section have non-uniform sizes, and
a filter coefficient in the filtering processing in the sub-pixel processing section has a value at an unevenly sampled point of a filter function.

12. The image display device according to claim 9,
wherein the sub-pixel colors other than the three primary colors include at least one color selected from yellow; cyan; magenta; white; red having a chroma different from that of the red as the primary color; green having a chroma different from that of the green as the primary color; and blue having a chroma different from that of the blue as the primary color.

13. An image displaying method executable by an image processing circuit for displaying an image on a display device in which color filters of sub-pixel colors including three principal colors of red, green, and blue as well as at least one color other than the three principal colors are arranged regularly, the method comprising:
  generating, by the image processing circuit, sub-pixel signals corresponding to the sub-pixel colors, respectively, from an input image signal of the three principal colors;
  giving, by the image processing circuit, to the sub-pixel signals, position information in accordance with an order of arrangement of the color filters of the sub-pixel colors in the display device, and performing a filtering processing sub-pixel by sub-pixel; and
  providing, by the image processing circuit, the display device with the processed sub-pixel signals to display the image,
  wherein the filtering processing includes:
    extracting, by the image processing circuit, a minimum value among those of a plurality of sub-pixel signals belonging to one pixel as a monochromatic component; and
    performing, by the image processing circuit, high-frequency component enhancement processing on the extracted monochromatic component.

14. An image displaying method executable by an image processing circuit for displaying an image on a display device in which color filters of sub-pixel colors including three principal colors of red, green, and blue as well as at least one color other than the three principal colors are arranged regularly, the method comprising:
  generating, by the image processing circuit, sub-pixel signals corresponding to the sub-pixel colors, respectively, from an input image signal of the three principal colors;
  giving, by the image processing circuit, to the sub-pixel signals, position information in accordance with an order of arrangement of the color filters of the sub-pixel colors in the display device, and performing a filtering processing sub-pixel by sub-pixel; and
  providing, by the image processing circuit, the display device with the processed sub-pixel signals to display the image,
  wherein the filtering processing includes:
    extracting, by the image processing circuit, a minimum value among those of a plurality of sub-pixel signals belonging to one pixel as a monochromatic component; and
    performing, by the image processing circuit, smoothing processing on the extracted monochromatic component.

15. An image displaying method executable by an image processing circuit for displaying an image on a display device in which color filters of sub-pixel colors including three principal colors of red, green, and blue as well as at least one color other than the three principal colors are arranged regularly, the method comprising:

performing, by the image processing circuit, high-frequency component enhancement processing pixel by pixel with respect to an input image signal of the three principal colors, generating, by the image processing circuit, sub-pixel signals corresponding to the sub-pixel colors, respectively, from the high-frequency component enhancement processed signal;

giving, by the image processing circuit, to the sub-pixel signals, position information in accordance with an order of arrangement of the color filters of the sub-pixel colors in the display device, and performing a filtering processing sub-pixel by sub-pixel; and providing, by the image processing circuit, the display device with the processed sub-pixel signals to display the image, wherein the filtering processing includes performing high-frequency component enhancement processing on the sub-pixel signals, and the high-frequency component enhancement processing includes:
- dividing, by the image processing circuit, the input image signal of the three principal colors into a brightness signal and a color-difference signal;
- performing, by the image processing circuit, high-frequency component enhancement processing with respect to the brightness signal; and
- converting, by the image processing circuit, the processed brightness signal and the color difference signal into the same form as that of the input image signal of the three principal colors.

\* \* \* \* \*